US011810493B2

(12) United States Patent
Nishiike

(10) Patent No.: US 11,810,493 B2
(45) Date of Patent: Nov. 7, 2023

(54) DISPLAY APPARATUS, METHOD FOR CONTROLLING DISPLAY APPARATUS, AND PROJECTION SYSTEM

(71) Applicant: SONY GROUP CORPORATION, Tokyo (JP)

(72) Inventor: Akihito Nishiike, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/596,684

(22) PCT Filed: May 6, 2020

(86) PCT No.: PCT/JP2020/018476
§ 371 (c)(1),
(2) Date: Dec. 16, 2021

(87) PCT Pub. No.: WO2020/261768
PCT Pub. Date: Dec. 30, 2020

(65) Prior Publication Data
US 2022/0319380 A1 Oct. 6, 2022

(30) Foreign Application Priority Data
Jun. 25, 2019 (JP) ................. 2019-117305

(51) Int. Cl.
*G09G 3/20* (2006.01)
*G09G 3/296* (2013.01)

(52) U.S. Cl.
CPC ........... *G09G 3/2037* (2013.01); *G09G 3/296* (2013.01); *G09G 2320/0266* (2013.01); *G09G 2360/16* (2013.01)

(58) Field of Classification Search
CPC ........ G02B 26/02; G03B 21/00; G03B 21/14; G09G 3/346; G09G 3/296; G09G 2360/16; G09G 3/20
See application file for complete search history.

(56) References Cited

U.S. PATENT DOCUMENTS

| 5,767,828 A | 6/1998 | McKnight |
| 5,959,598 A | 9/1999 | McKnight |

(Continued)

FOREIGN PATENT DOCUMENTS

| CN | 1194051 A | 9/1998 |
| CN | 1617200 A | 5/2005 |

(Continued)

OTHER PUBLICATIONS

International Search Report and Written Opinion of PCT Application No. PCT/JP2020/018476, dated Jun. 23, 2020, 11 pages of ISRWO.

*Primary Examiner* — Olga V Merkoulova
(74) *Attorney, Agent, or Firm* — CHIP LAW GROUP

(57) ABSTRACT

A display apparatus of the present disclosure includes: an image detection unit that determines whether an empty second subframe is present in input image data, in addition to a first subframe that displays an image; a correction image generation unit that generates correction image data for correcting the input image data; a control unit that performs control to display the correction image data generated by the correction image generation unit during the period of the second subframe, when the image detection unit detects that the second subframe is present in the input image data; and a display panel that includes a light modulation device provided for each pixel, and modulates irradiation light from a light source, on the basis of input image data including the correction image data.

18 Claims, 19 Drawing Sheets

(56) References Cited

U.S. PATENT DOCUMENTS

| | | | | |
|---|---|---|---|---|
| 7,322,700 | B2 * | 1/2008 | Miyagaki | H04N 9/3188 |
| | | | | 359/623 |
| 10,860,100 | B2 * | 12/2020 | Osterhout | G06F 3/012 |
| 11,070,776 | B2 * | 7/2021 | Nakajima | H04N 9/3155 |
| 2005/0073484 | A1 * | 4/2005 | Kim | G09G 3/2037 |
| | | | | 345/63 |
| 2005/0231444 | A1 | 10/2005 | Takeuchi et al. | |
| 2007/0008495 | A1 * | 1/2007 | Miyagaki | H04N 9/3188 |
| | | | | 353/38 |
| 2008/0158441 | A1 * | 7/2008 | Yamamuro | H04N 9/3111 |
| | | | | 348/E9.027 |
| 2013/0002728 | A1 * | 1/2013 | Clatanoff | G09G 3/346 |
| | | | | 345/690 |
| 2016/0323549 | A1 * | 11/2016 | Nakajima | H04N 9/3155 |

FOREIGN PATENT DOCUMENTS

| | | | |
|---|---|---|---|
| CN | 1684122 | A | 10/2005 |
| EP | 1587055 | A3 | 10/2005 |
| JP | 11-038933 | A | 2/1999 |
| JP | 11-065521 | A | 3/1999 |
| JP | 11-095719 | A | 4/1999 |
| JP | 11-509647 | A | 8/1999 |
| JP | 2005-308815 | A | 11/2005 |
| JP | 2007-078866 | A | 3/2007 |
| JP | 2012-053138 | A | 3/2012 |
| KR | 10-2005-0032354 | A | 4/2005 |
| KR | 10-2006-0042040 | A | 5/2006 |
| WO | 97/004436 | A1 | 2/1997 |

* cited by examiner

FIG. 3
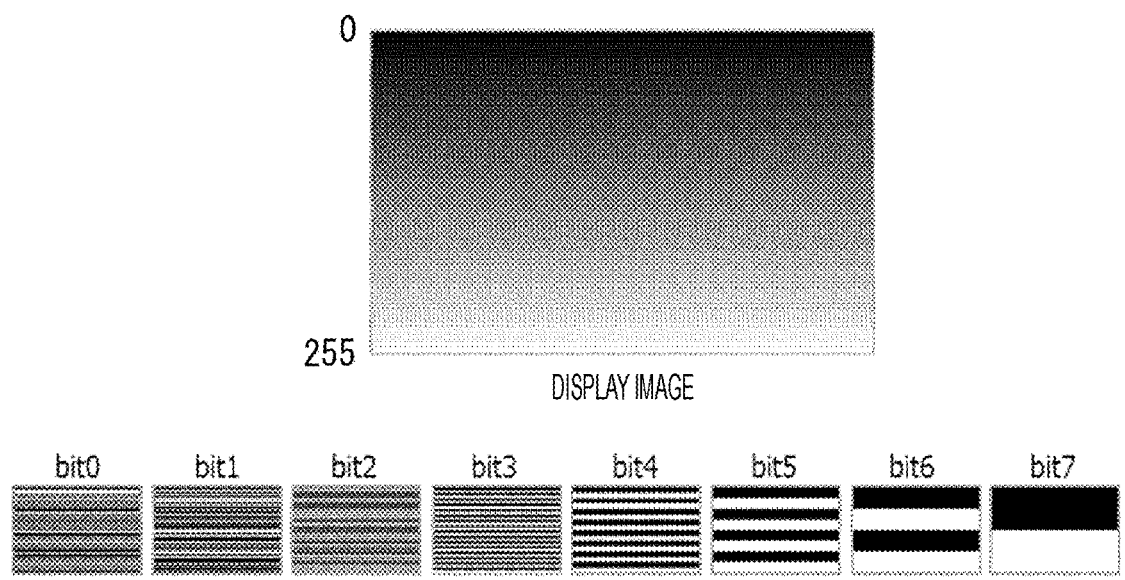
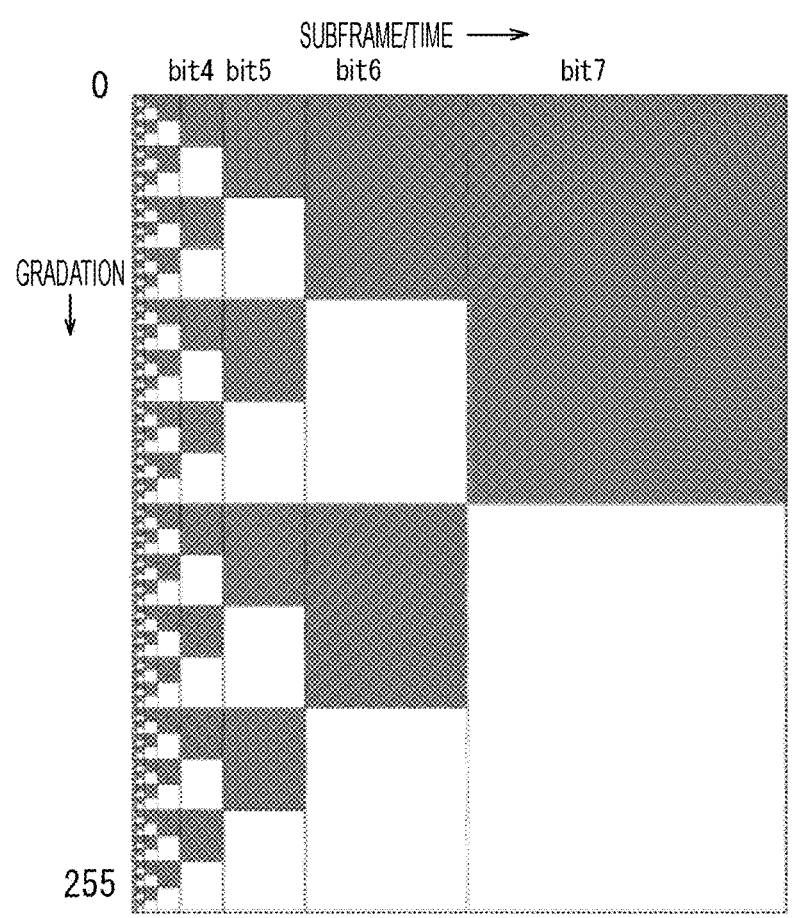

DISPLAY IMAGE

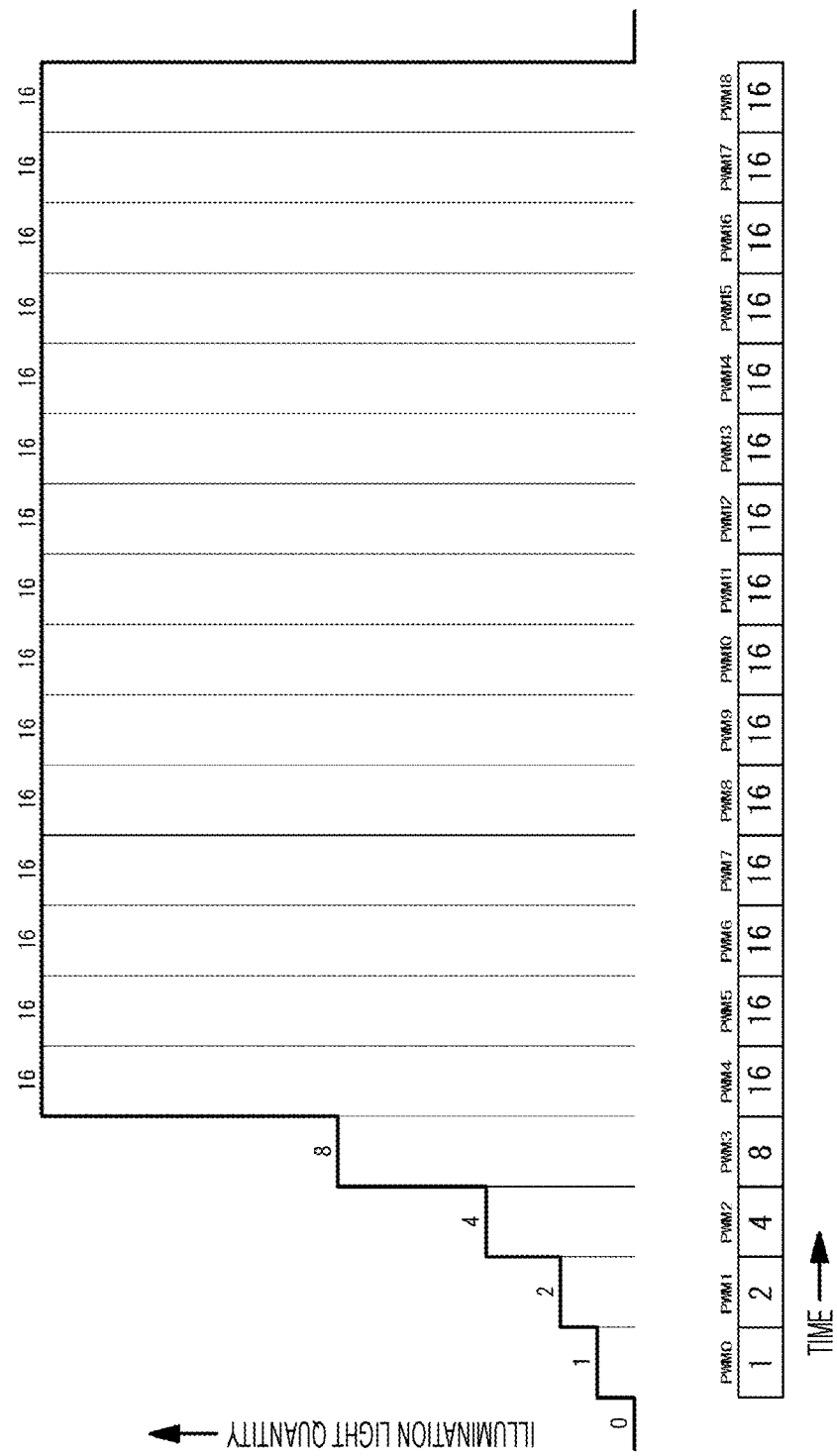

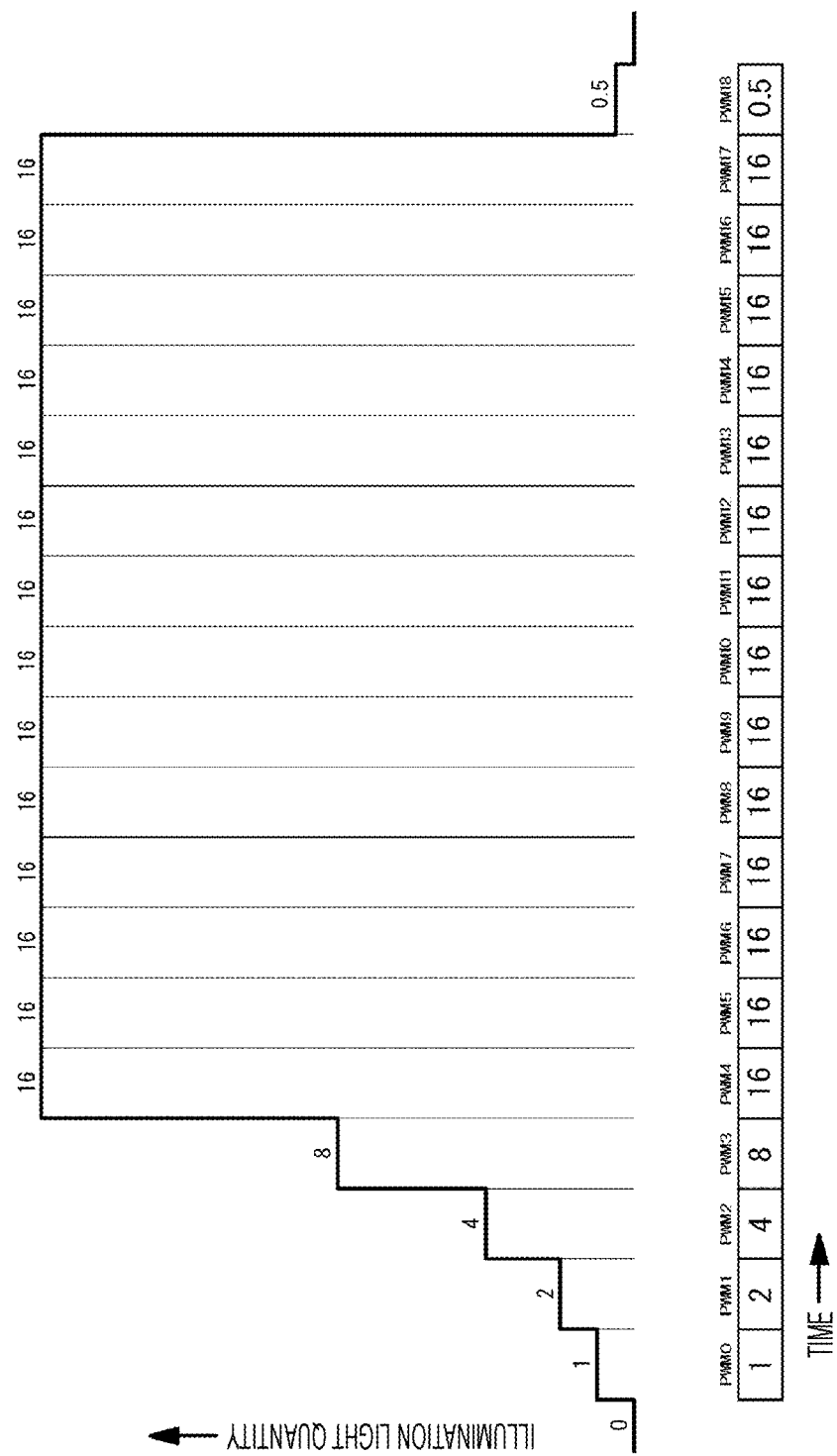

FIG. 16

| | PWM0 | PWM1 | PWM2 | PWM3 | PWM4 | PWM5 | PWM6 | PWM7 | PWM8 | PWM9 | PWM10 | PWM11 | PWM12 | PWM13 | PWM14 | PWM15 | PWM16 | PWM17 | PWM18 |
|---|---|---|---|---|---|---|---|---|---|---|---|---|---|---|---|---|---|---|---|
| PWM TIME | 1 | 2 | 4 | 8 | 16 | 16 | 16 | 16 | 16 | 16 | 16 | 16 | 16 | 16 | 16 | 16 | 16 | 16 | 16 |
| LIGHT QUANTITY | 1 | 1 | 1 | 1 | 1 | 1 | 1 | 1 | 1 | 1 | 1 | 1 | 1 | 1 | 1 | 1 | 1 | 1 | 0.5 |
| PWM × LIGHT QUANTITY | 1 | 2 | 4 | 8 | 16 | 16 | 16 | 16 | 16 | 16 | 16 | 16 | 16 | 16 | 16 | 16 | 16 | 16 | |

DISPLAY APPARATUS, METHOD FOR CONTROLLING DISPLAY APPARATUS, AND PROJECTION SYSTEM

CROSS REFERENCE TO RELATED APPLICATIONS

This application is a U.S. National Phase of International Patent Application No. PCT/JP2020/018476 filed on May 6, 2020, which claims priority benefit of Japanese Patent Application No. JP 2019-117305 filed in the Japan Patent Office on Jun. 25, 2019. Each of the above-referenced applications is hereby incorporated herein by reference in its entirety.

TECHNICAL FIELD

The present disclosure relates to a display apparatus, a method for controlling the display apparatus, and a projection system (a projector or a projection display apparatus).

BACKGROUND ART

There have been display apparatuses that use electromagnetically-driven micromirrors (so-called MEMS mirrors) to which the microelectromechanical system (MEMS) technology is applied, as light modulation devices (light modulators). A MEMS mirror is a binary display device (a spatial light modulator (SLM)) in an on- or off-state. In a case where gradation is expressed with binary display devices such as MEMS mirrors, a system called subframe driving is adopted. In this system, the period of one display frame (hereinafter referred to simply as a "frame" in some cases) that is a unit of display of one image is divided into several periods, and an image is displayed for each period of the divided subframes.

There is a technique suggested for prolonging the life of a light source by efficiently using the light source in a display apparatus that adopts the subframe driving system (see Patent Document 1, for example). By this conventional technique, the maximum gradation values of the respective colors of red (R), green (G), and blue (B) are determined and are replaced with white (W) subframes. Further, to effectively utilize the free time generated in the frame by the replacement with W, the entire frame is expanded while the color balance among RGBW signals is maintained.

CITATION LIST

Patent Document

Patent Document 1: Japanese Patent Application Laid-Open No. 2012-53138

SUMMARY OF THE INVENTION

Problems to be Solved by the Invention

According to the conventional technique described above, the color balance and the light quantity of illumination light can be easily maintained. By this conventional technique, however, no change is caused in image quality. Therefore, insufficiency of low gradation levels cannot be solved, and image quality cannot be improved/increased, which are the problems in a case where gradation is expressed with binary display devices such as MEMS mirrors.

The present disclosure aims to provide a display apparatus that can solve insufficiency of low gradation levels and improve/increase image quality, a method for controlling the display apparatus, and a projection system that uses the display apparatus and the method for controlling the display apparatus.

Solutions to Problems

A display apparatus of the present disclosure for achieving the above object includes:
  an image detection unit that detects presence of an empty second subframe in input image data, in addition to a first subframe that displays an image;
  a correction image generation unit that generates correction image data for correcting the input image data;
  a control unit that performs control to display the correction image data generated by the correction image generation unit during the period of the second subframe, when the image detection unit detects the presence of the second subframe; and
  a display panel that includes a light modulation device provided for each pixel, and modulates irradiation light from a light source, on the basis of the input image data including the correction image data.

Further, a display apparatus control method of the present disclosure for achieving the above object includes:
  detecting presence of an empty second subframe in input image data, in addition to a first subframe that displays an image, and generating correction image data for correcting the input image data;
  performing control to display the generated correction image data during the period of the second subframe, when the presence of the second subframe is detected; and
  modulating irradiation light from a light source, on the basis of input image data including the correction image data, in a display panel that includes a light modulation device provided for each pixel.

Further, a projection system of the present disclosure for achieving the above object includes:
  an image detection unit that detects presence of an empty second subframe in input image data, in addition to a first subframe that displays an image;
  a correction image generation unit that generates correction image data for correcting the input image data;
  a control unit that performs control to display the correction image data generated by the correction image generation unit during the period of the second subframe, when the image detection unit detects the presence of the second subframe;
  a display panel that includes a light modulation device provided for each pixel, and modulates irradiation light from a light source, on the basis of input image data including the correction image data; and
  a projection optical system that projects light that has passed through the display panel.

BRIEF DESCRIPTION OF DRAWINGS

FIG. 3 is a diagram for explaining an example of gradation display in the case of three-plate subframe driving.

FIG. 14 is a diagram showing an example of light quantity control at the time when subframes are equally divided.

FIG. 15 is a diagram showing an example of the light quantity control at a time when a second subframe is detected.

FIG. 16 is a diagram showing an example of light quantity control on a second subframe at a time when subframes are divided so that a total of 255 gradation levels are obtained across the respective subframes.

MODES FOR CARRYING OUT THE INVENTION

Figure 1:
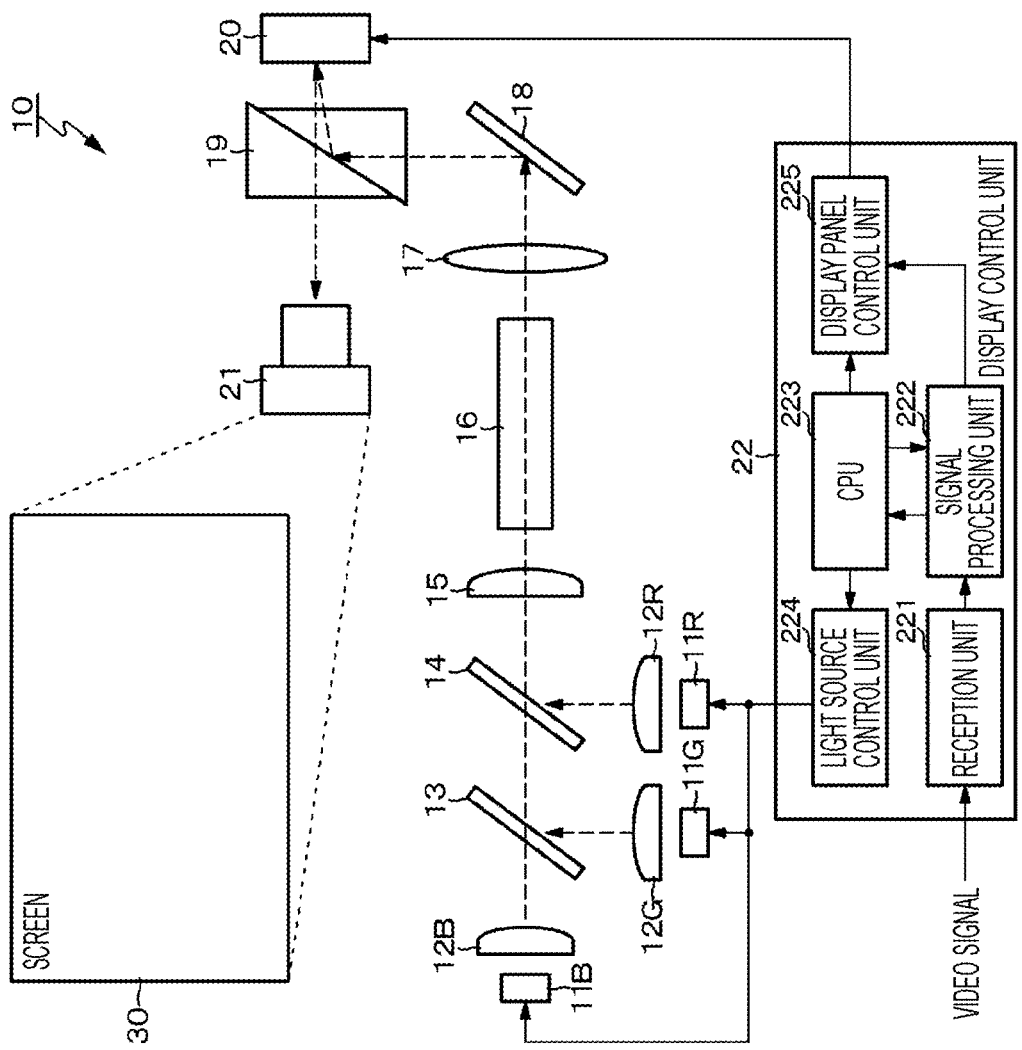
FIG. 1 is a system configuration diagram showing an example of a basic system configuration of a projection system.

The following is a detailed description of modes for carrying out the technique according to the present disclosure (the modes will be hereinafter referred to as "embodiments"), with reference to the accompanying drawings. The technique according to the present disclosure is not limited to the embodiment, and various numerical values and the like used in the embodiment are examples. In the description below, like components or components having like functions are denoted by like reference numerals, and explanation of them will not be made more than once. Note that explanation will be made in the following order.

1. Overall description of a display apparatus, a method for controlling the display apparatus, and a projection system according to the present disclosure
  2. Outline of a projection system
    2-1. Example of a basic system configuration
    2-2. Subframe driving system
  3. Display apparatus according to an embodiment
    3-1. Example 1 (an example configuration of a control system)
    3-2. Example 2 (a modification of Example 1: a modification of correction image data)
    3-3. Example 3 (a modification of Example 1: an example of timing to generate correction image data)
    3-4. Example 4 (a modification of Example 1: an example configuration of a second subframe)
    3-5. Example 5 (an example in which the display panel is formed with a single plate and is controlled by field sequential colors)
    3-6. Example 6 (a modification of Example 1: an example of a light source that illuminates the display panel during the period of a second subframe)
    3-7. Example 7 (a modification of Example 1: an example sequence in which a second subframe is divided)
  4. Projection system according to an embodiment
    4-1. Example 8 (an example configuration of a single-plate MEMS mirror projection system)
    4-2. Example 9 (an example in which the quantity of the irradiation light to be emitted onto the display panel is controlled in synchronization with subframes)
    4-3. Example 10 (a modification of Example 5: an example of light quantity control on a second subframe)
    4-4. Example 11 (an example of an image to be generated in a second subframe)
    4-5. Example 12 (a modification of Example 9: an example of the control on the light quantity and the correction image at a time when a second subframe is detected)
    4-6. Example 13 (a modification of Example 12: an example of the control on the light quantity and the correction images at a time when a second subframe is detected)
  5. Modifications
  6. Configurations in which the present disclosure can be embodied <Overall Description of a Display Apparatus, a Method for Controlling the Display Apparatus, and a Projection System According to the Present Disclosure>

In a display apparatus, a method for controlling the display apparatus, and a projection system according to the present disclosure, a light modulation device can be formed with a binary display device in an on- or off-state, or preferably a MEMS mirror.

In the display apparatus, the method for controlling the display apparatus, and the projection system according to the present disclosure including the preferred configuration described above, the correction image generation unit can be designed to generate correction image data for correcting the gradation, the color gamut, or the resolution of input image data. Further, the correction image generation unit can also be designed to generate the correction image data, after detection of a second subframe, or regardless of the presence or absence of the second subframe. The second subframe may be formed with one subframe or a plurality of subframes.

Also, in the display apparatus, the method for controlling the display apparatus, and the projection system according to the present disclosure including the preferred configuration described above, the light source can be designed to emit light of a single color or a plurality of colors onto a display panel during the period of the second subframe. Further, the light source that illuminates the display panel during the period of the second subframe may be a light source having the same wavelength as the wavelength during the period of a first subframe, or a light source having a different wavelength from the wavelength during the period of the first subframe.

Further, in the display apparatus, the method for controlling the display apparatus, and the projection system according to the present disclosure including the preferred configuration described above, the light source can be designed to emit illumination light onto the display panel over the entire period of the second subframe or during part of the period of the second subframe. Furthermore, the period of the second subframe can be divided into a plurality of subframes, and different correction image data can be displayed in the periods of the plurality of divided subframes.

Also, in the display apparatus, the method for controlling the display apparatus, and the projection system according to the present disclosure including the preferred configuration described above, the control unit can be designed to control the quantity of the irradiation light generated by the light source, in synchronization with subframes. Further, the control unit can also be designed to control the light source in synchronization with subframes. Further, the control unit can be designed to change the quantity of the irradiation light generated by the light source, in two or more stages.

Also, in the display apparatus, the method for controlling the display apparatus, and the projection system according to the present disclosure including the preferred configuration described above, the light source can be designed to emit light of a single color or a plurality of colors onto a display panel during the period of the second subframe. Further, the light source that illuminates the display panel during the period of the second subframe may be a light source having the same wavelength as the wavelength during the period of a first subframe, or a light source having a different wavelength from the wavelength during the period of the first subframe.

Further, in the display apparatus, the method for controlling the display apparatus, and the projection system according to the present disclosure including the preferred configuration described above, the light source can be designed to emit illumination light onto the display panel over the entire period of the second subframe or during part of the period of the second subframe. Furthermore, the period of the second subframe can be divided into a plurality of subframes, and different correction image data can be displayed in the periods of the plurality of divided subframes.

<Outline of a Projection System>

A display apparatus according to the present disclosure can be used in a projection system (a projector or a projection display apparatus). As a projection system in which a display apparatus according to the present disclosure is used, a MEMS mirror projection system using MEMS mirrors that are binary display devices in an on- or off-state as light modulation devices (light modulators), for example, are briefly described herein.

[Example of a Basic System Configuration]

FIG. 1 is a system configuration diagram showing an example of a basic system configuration of a projection system. A system configuration in which a single display panel, or a single panel, is used is described herein.

As shown in FIG. 1, a projection system 10 according to this example includes respective solid-state light sources 11R, 11G, and 11B of red (R), green (G), and blue (B). Light emitted from each of the solid-state light sources 11R, 11G, and 11B of R, G, and B passes through lenses 12R, 12G, and 12B, and then enters a rod integrator 16 via dichroic mirrors 13 and 14, and a lens 15.

The light uniformized by the rod integrator 16 is emitted onto a display panel 20 through a lens 17, a mirror 18, and a total reflection prism 19. The total reflection prism 19 includes a combination of two triangular prisms. The display panel 20 has a configuration in which pixels are arranged in a two-dimensional matrix (a matrix), and a MEMS mirror that is a binary display device in an on- or off-state is provided for each pixel.

The solid-state light sources 11R, 11G, and 11B, and the display panel 20 are controlled by a display control unit 22. The display control unit 22 includes a reception unit 221, a signal processing unit 222, a central processing unit (CPU) 223, a light source control unit 224, and a display panel control unit 225.

When a single-plate display panel is used as the display panel 20, the light source control unit 224 under the control of the CPU 223 temporally controls light emission from the light sources of the respective colors, which are the solid-state light sources 11R, 11G, and 11B of R, G, and B, in the display control unit 22 having the above configuration. Under the control of the CPU 223, the signal processing unit 222 performs predetermined signal processing on a video signal input from the outside through the reception unit 221, and supplies video data to the display panel control unit 225.

Under the control of the display panel control unit 225, each pixel of the display panel 20 transitions to a predetermined state in synchronization with each of the solid-state light sources 11R, 11G, and 11B of R, G, and B. Then, the pixels in a bright state (an on-state) in the display panel 20 are then projected onto a screen 30 via the total reflection prism 19 and a projection lens 21.

[Subframe Driving System]

Figure 2:
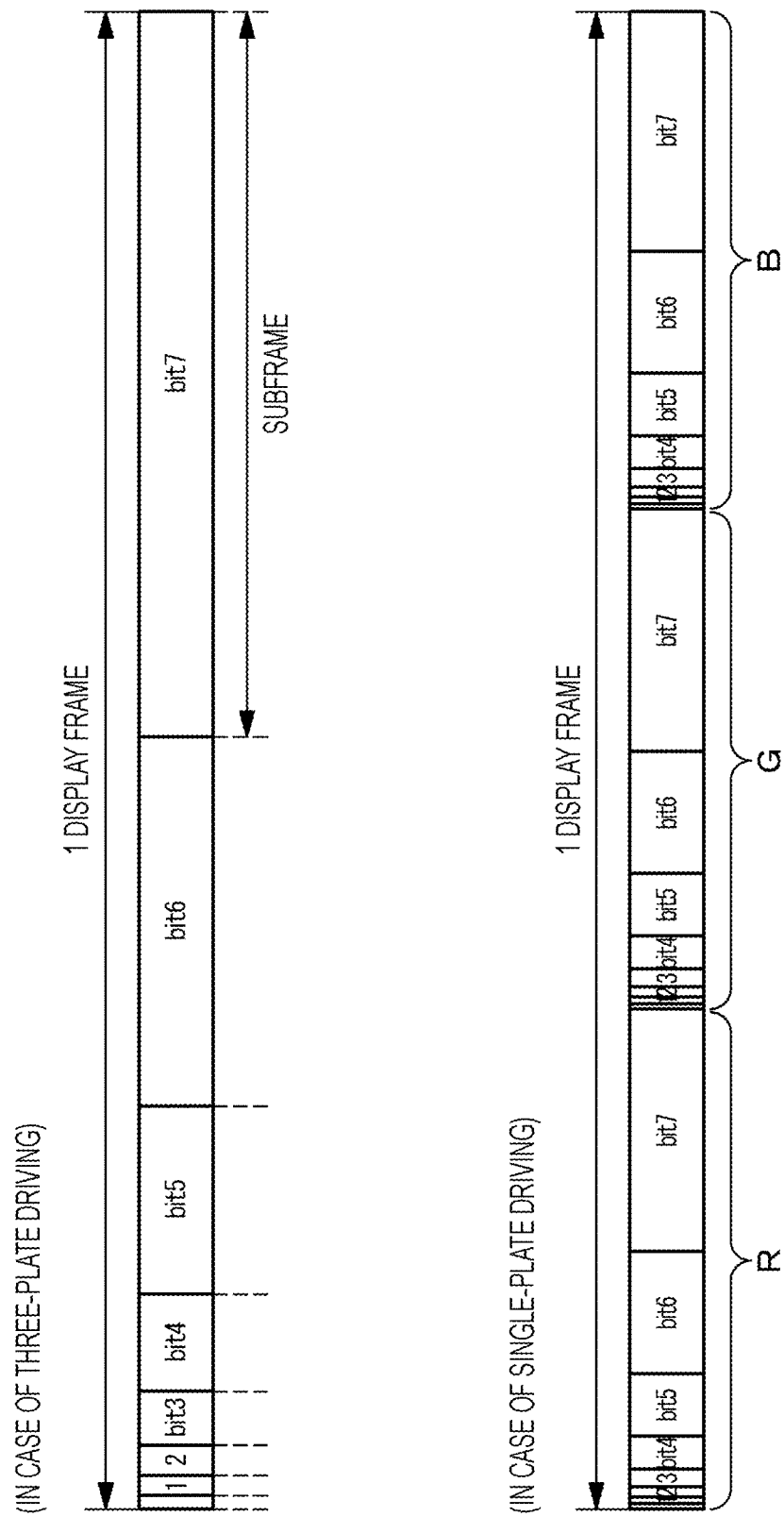
FIG. 2 is a diagram showing an example of subframe driving in the case of a three-plate type, and an example of subframe driving in the case of a single-plate type.

Meanwhile, in a case where gradation is expressed with a binary display device such as a MEMS mirror, a subframe driving system that divides one display frame period into several subframe periods is adopted, as shown in FIG. 2. The upper half of FIG. 2 shows an example of subframe driving in the case of a three-plate type, and the lower half of FIG. 2 shows an example of subframe driving in the case of a single-plate type.

To display gradation in the simplest manner with the subframe driving system, a binary image of each corresponding bit is displayed over the period of the subframe for the intensity of each bit, so that the entire frame is integrated and can be recognized as the gradation by the human eye. That is, the subframe driving system is a driving system that expresses gradation and luminance, using the integrated time of binary images.

FIG. 3 shows a diagram for explaining an example of gradation display in the case of three-plate subframe driving. For example, in a case where display gradation is 8-bit and 0- to 255-level gradation, one display frame is divided into eight periods. The times of the divided subframes correspond to bits 0 to 7 of the image data. For example, the times of the respective subframes in a case where one display frame is 60 Hz (16.6 ms) are as follows.

Subframe bit 0: 16.6 ms×1/255
Subframe bit 1: 16.6 ms×2/255
Subframe bit 2: 16.6 ms×4/255
Subframe bit 3: 16.6 ms×8/255
Subframe bit 4: 16.6 ms×16/255
Subframe bit 5: 16.6 ms×32/255
Subframe bit 6: 16.6 ms×64/255
Subframe bit 7: 16.6 ms×128/255

According to this subframe driving system, it is possible to express gradation levels 0 to 255 by displaying binary image data of the respective bits during the time of subframe bits 0 to bit 7, as shown in FIG. 3. Then, the entire frame is then integrated and can be recognized as gradation by the human eye.

<Display Apparatus According to an Embodiment>

In a binary display device such as a MEMS mirror, however, luminance varies linearly with respect to gradation characteristics. In that case, when converted to luminance, intermediate to low gradation levels are in a bright state, and black appears protruding to the human eye. It is possible to perform a process of reducing black protrusions depending on gamma characteristics. In a case where this process is performed, however, if the number of gradation levels is not large enough, problems such as noise like flickering and blackening occur.

Therefore, with a display apparatus according to an embodiment of the present disclosure, gradation levels are raised so that gamma characteristics can be set more finely, especially in a dark display image. With this arrangement, it is possible to solve the shortage of low gradation levels, and reduce noise and blackening when low gradation levels are displayed. Thus, image quality can be improved/increased.

To raise gradation levels in a dark display image and set gamma characteristics more finely, the display apparatus according to this embodiment detects presence or absence of an empty second subframe in input image data in addition to a first subframe for displaying an image, generates correction image data for correcting the input image data, and performs control to display the generated correction image data during the period of the second subframe when the presence of the second subframe is detected (a control method according to the present disclosure). Here, the "correction image data" is image data for correcting the gradation, the color gamut, or the resolution of the input image data.

In the description below, specific examples of (a method for controlling) a display apparatus according to this embodiment for raising gradation levels and enabling finer setting of gamma characteristics especially in a dark display image are explained.

Example 1

Figure 4:
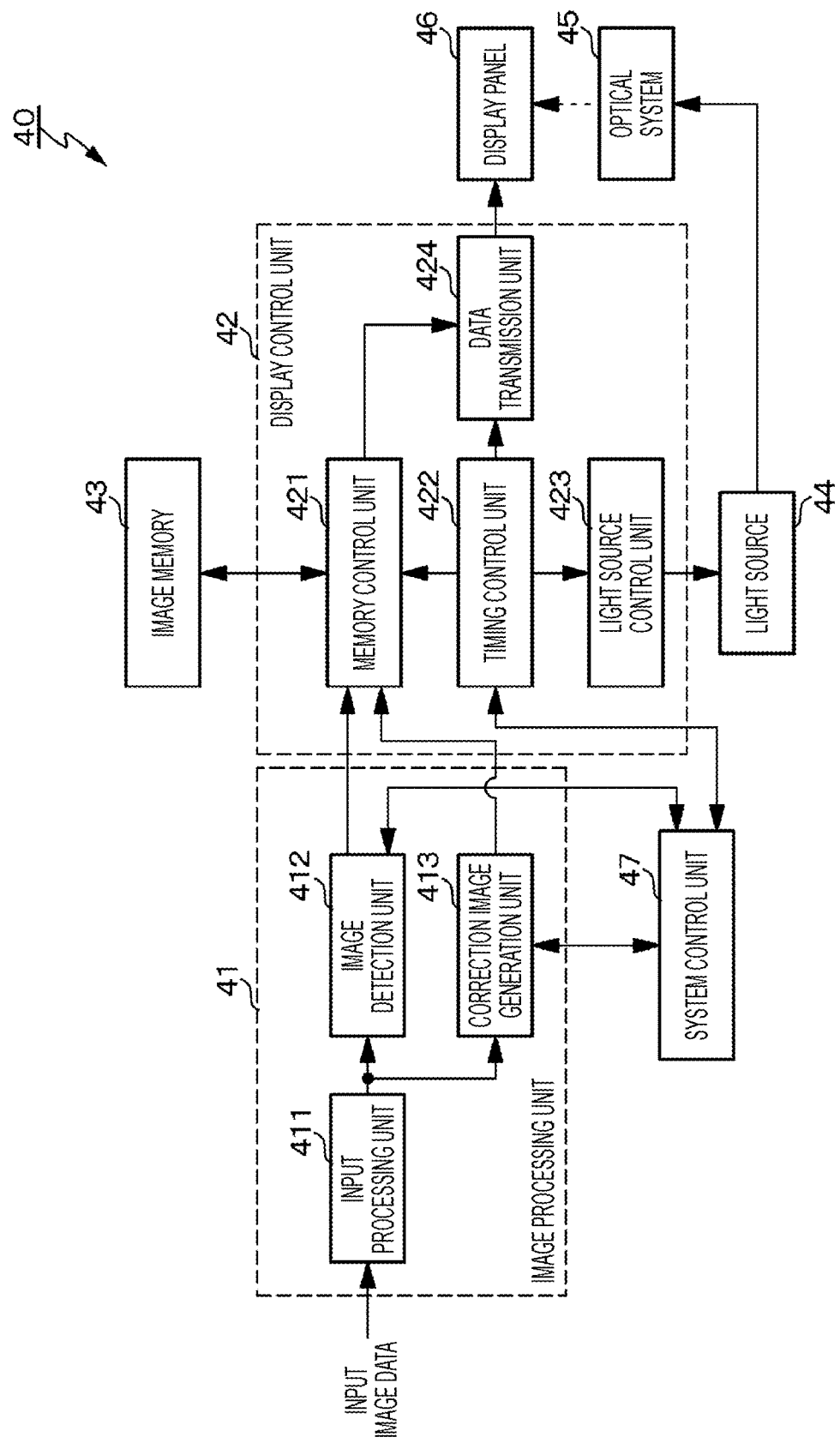
FIG. 4 is a block diagram showing an example configuration of the control system of a display apparatus according to Example 1.

Example 1 is an example configuration of the control system of a display apparatus according to an embodiment of the present disclosure. FIG. 4 is a block diagram of the control system of a display apparatus according to Example 1.

A display apparatus 40 according to Example 1 includes an image processing unit 41, a display control unit 42, an image memory 43, a light source 44, an optical system 45, a display panel 46, and a system control unit 47. In the display apparatus 40 according to Example 1, the display panel 46 has a configuration in which pixels are arranged in a two-dimensional matrix (a matrix), and a binary display device in an on- or off-state, such as a MEMS mirror, for example, is provided for each pixel. The system control unit 47 is formed with a microprocessor, for example.

The image processing unit 41 includes an input processing unit 411, an image detection unit 412, and a correction image generation unit 413, and processes image data (gradation data) that is input from the outside. In this image processing unit 41, the input processing unit 411 performs image processing such as gamma (γ) processing on the input image data.

Under the control of the system control unit 47, the image detection unit 412 determines the image level of the entire one frame of the input image data that has passed through the input processing unit 411, and determines whether there is an empty second subframe that is not used in the display gradation, in addition to the first subframe for displaying an image with the input image data.

Figure 5A:
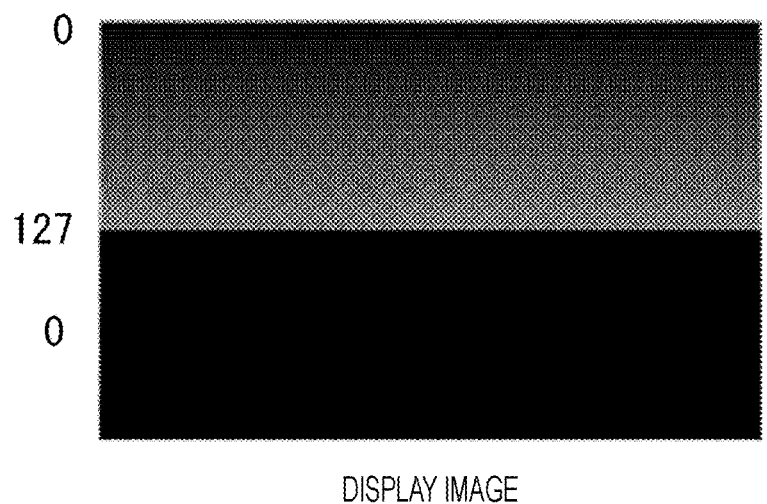
FIG. 5A is a view of a display image in a case where only gradation levels 0 to 127 exist.

For example, in a case where the display gradation and the subframes use a table shown in the lower part of FIG. 3, only the first subframe exists in the image in which all the gradation levels 0 to 255 are displayed. However, in a case where only gradation levels 0 to 127 exist in the display image as shown in FIG. 5A, there is no image to be displayed with the subframe of bit 7 in FIG. 5B. Therefore, the image detection unit 412 detects the subframe of bit 7 as an empty second subframe.

The definition of a second subframe with respect to display gradation is described below.

$$A \subset B \qquad \text{[Mathematical Expression 1]}$$

Here, A represents the display gradation section, and B represents each second subframe. Mathematical Expression 1 means that the display gradation section A is not included in each second subframe B. In the case of the above example, $$0\sim127 \subset 128\sim255 \qquad \text{[Mathematical Expression 2]}$$

is established.

The simplest example among specific example detection methods for the image detection unit 412 can be a method for determining that any second subframe does not exist in a case where there is data equal to or higher than a threshold that is the lower limit of the higher gradation subframe period. Further, if a plurality of such thresholds is set, a plurality of second subframes can be detected.

Also, another example of a detection method to be implemented by the image detection unit 412 can be a method for multiplying all the pieces of the data of the respective pixels by one another, and determining that there is a second subframe if the multiplication result is "0", because the display data of each subframe is binary data (data "0" or "1").

In a case where the image detection unit 412 detects the presence of a second subframe, the correction image generation unit 413 generates correction image data for correcting the gradation of the input image data, under the control of the system control unit 47. For example, when bit 0 is 1/255, image data of a gradation level of 0.5/255, which is lower than bit 0, is generated as correction image data. Such correction image data can be generated with an algorithm such as a linear interpolation method or an error diffusion method, for example.

The display control unit 42 includes a memory control unit 421, a timing control unit 422, a light source control unit 423, and a data transmission unit 424, and, under the control of the system control unit 47, controls the image memory 43 and the light source 44.

In this display control unit 42, the memory control unit 421 stores, into the image memory 43, the image data of the first subframe and the second subframe passing through the image processing unit 41, and supplies the image data to the data transmission unit 324 in accordance with a predetermined sequence. The data transmission unit 324 transmits the image data of the first subframe and the second subframe supplied from the memory control unit 421, to the display panel 46.

Figure 6:
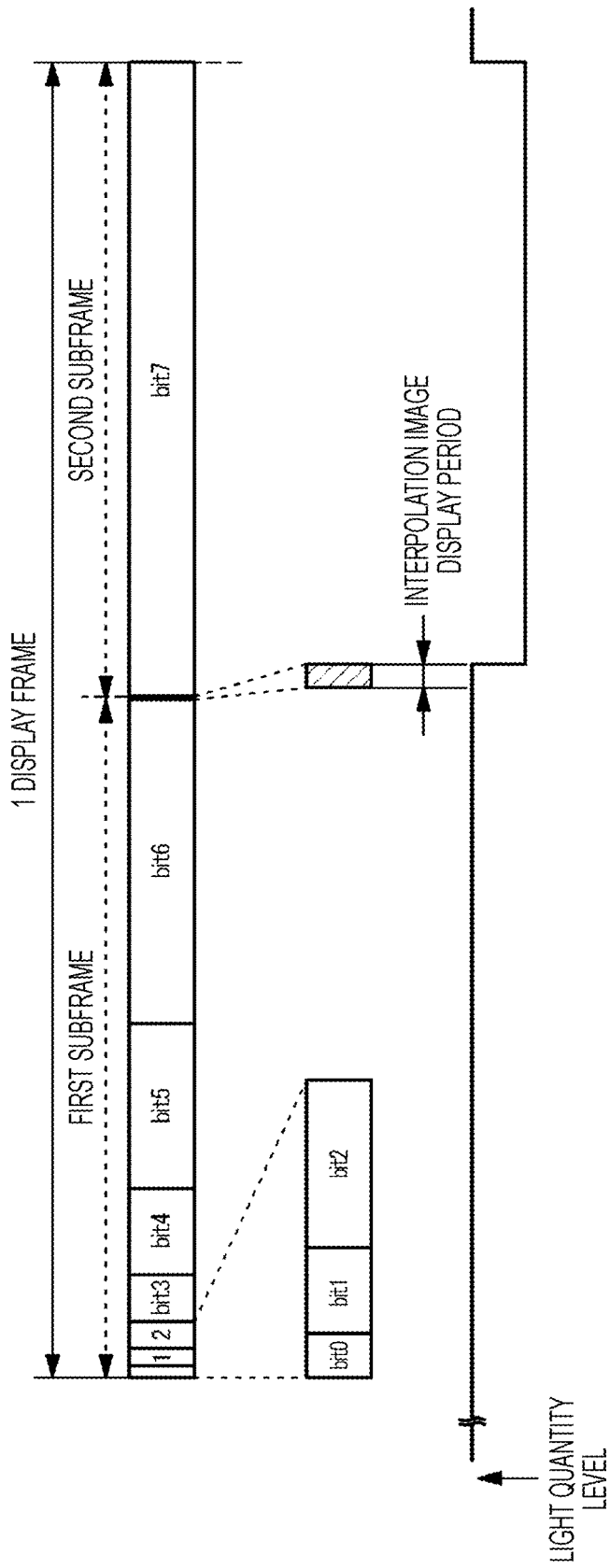
FIG. 6 is a timing waveform chart showing an example of light quantity control at a time of correction image display.

In a case where the light emitted from light source 44 onto the display panel 46 has a constant light quantity at this point of time, normal light quantity control is performed on the quantity of light to be emitted during the period of the first subframe. On the other hand, in the light quantity control at the time of display of the correction image data generated by the correction image generation unit 413, light is emitted only during the correction image display period of the second subframe (=one frame time×0.5/255), and no light is emitted during the remaining period, as shown in FIG. 6.

Figure 5B:
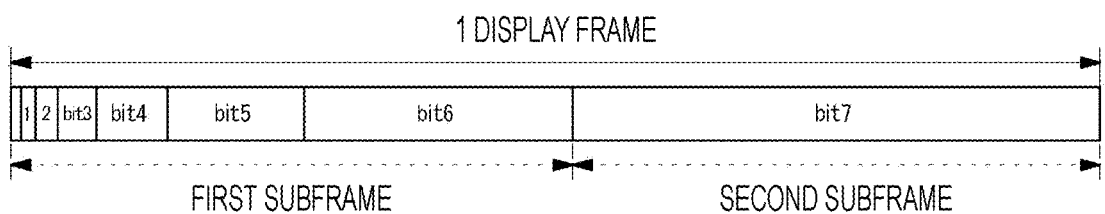
FIG. 5B is a diagram showing an example of detection of a first subframe and a second subframe linked to the display image.
Figure 7:
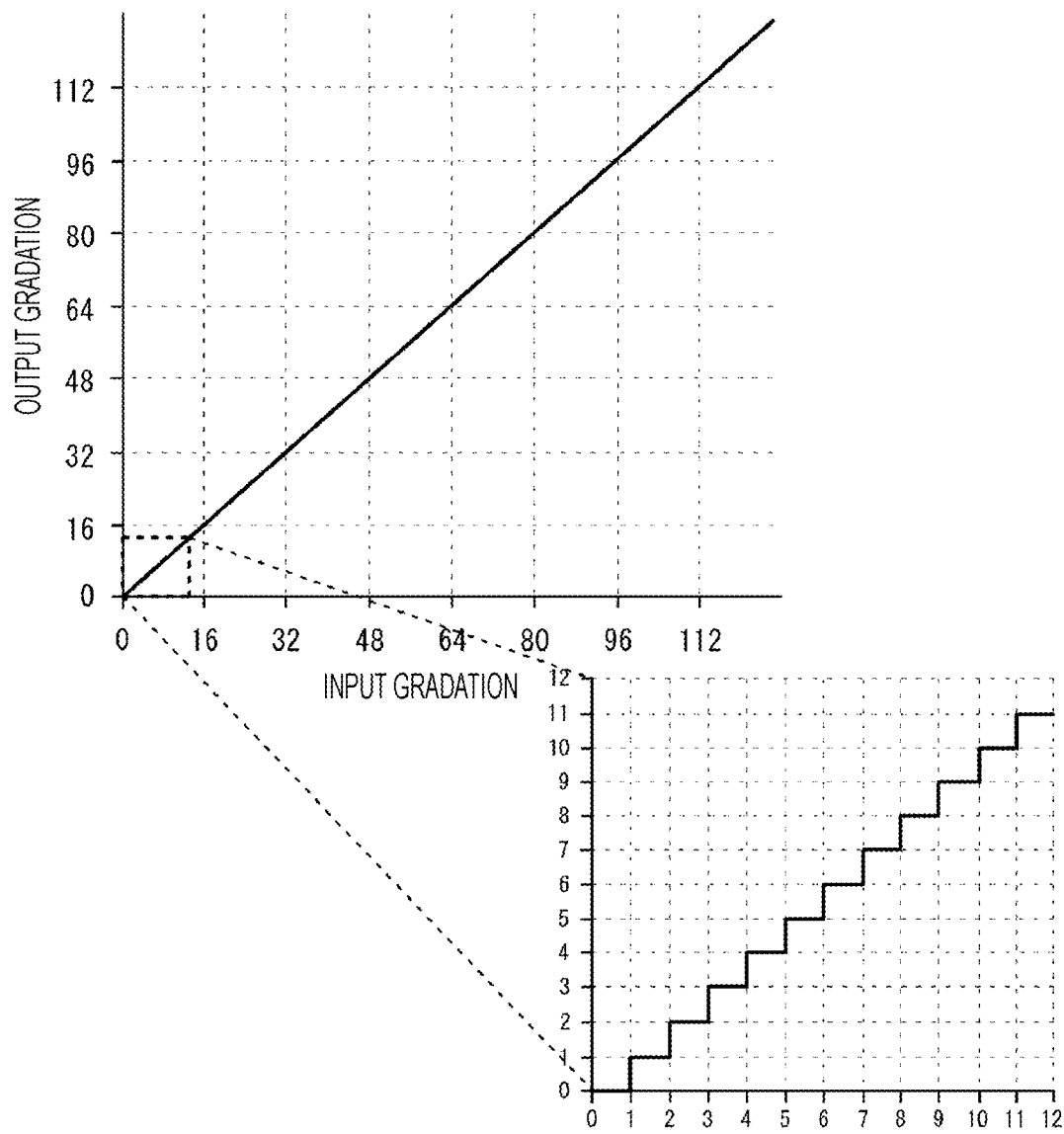
FIG. 7 is a conceptual diagram of gradation display by conventional light quantity control.
Figure 8:
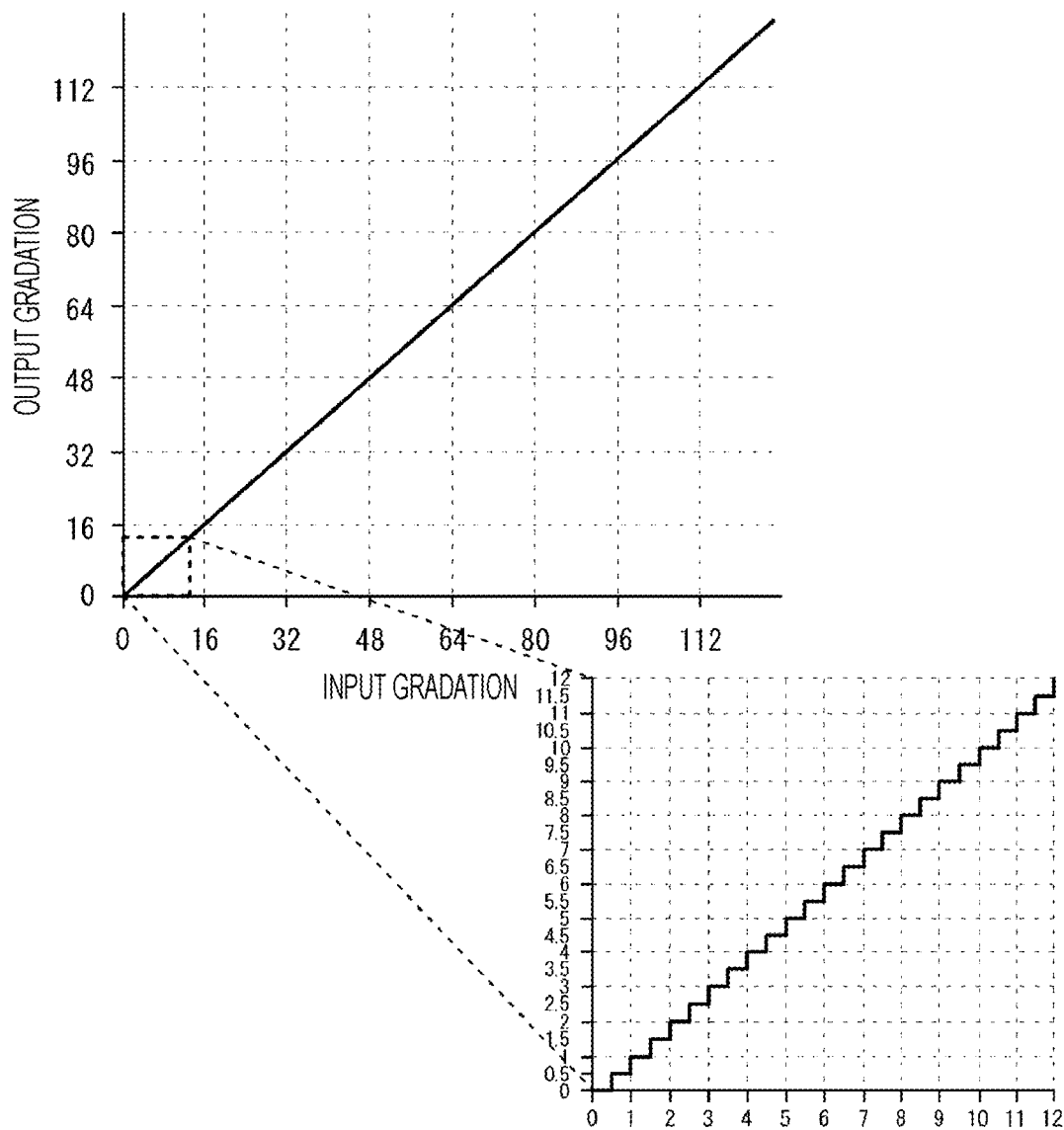
FIG. 8 is a conceptual diagram of gradation display by light quantity control in the display apparatus according to Example 1.

As such control is performed, an image that has been expressed in 127 steps when displaying gradation levels 0 to 127 as shown in FIG. 7 can display a smooth gradation image in 254 steps with 0.5 increments in between as shown in FIG. 8. Thus, the image quality of a low gradation image can be improved. Further, when the subframes are divided, the subframes can be divided not on the basis of simple bit data as shown in FIG. 5B, but by weighting so that 255 gradation levels are obtained across the respective subframes as shown in FIGS. 9A and 9B.

Figure 9A:
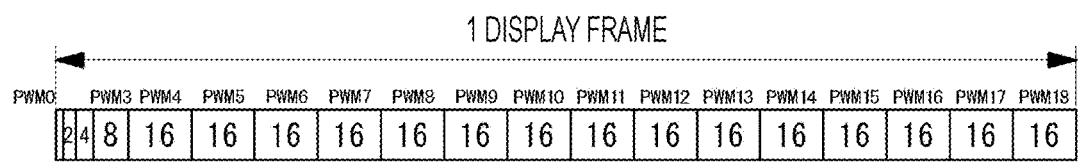
FIG. 9A is a diagram showing an example of weighting based on time according to a modification of subframe dividing.
Figure 9B:
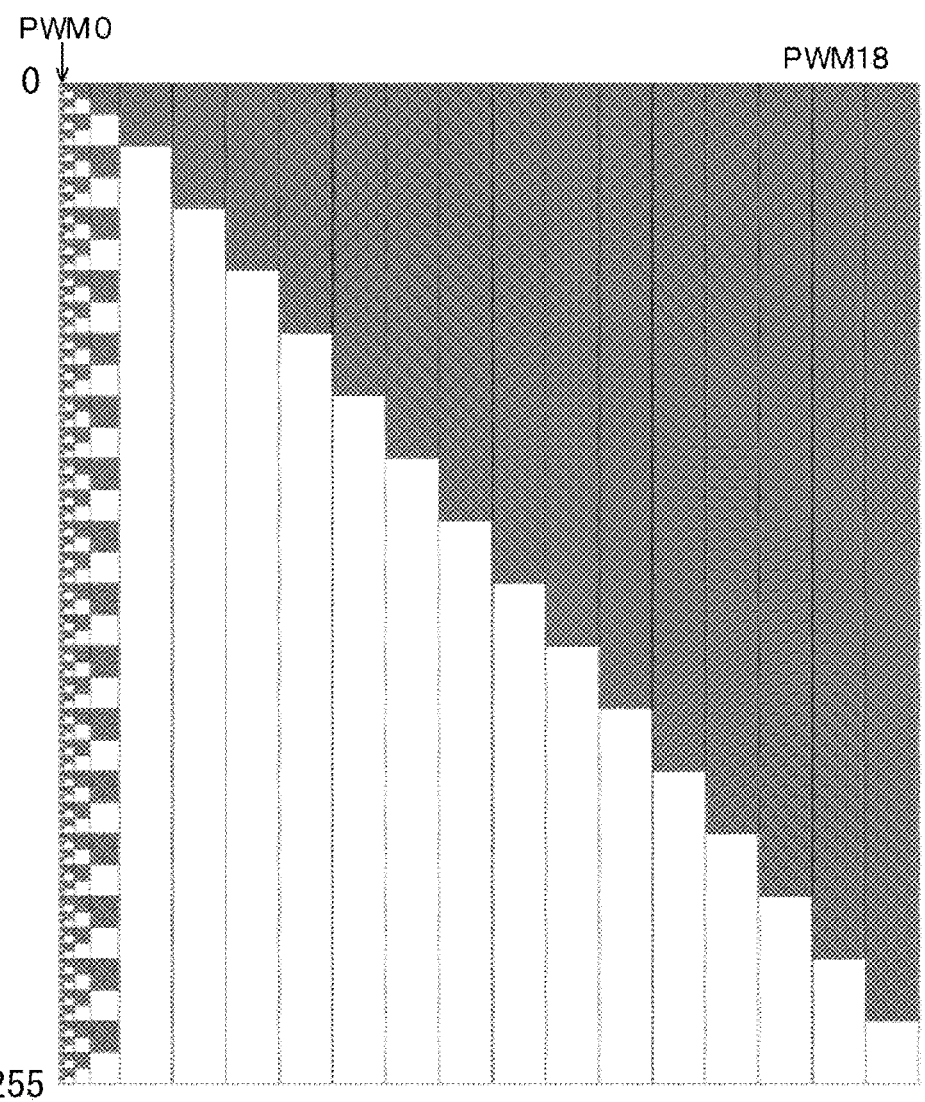
FIG. 9B is a diagram showing a table of display gradation and subframes according to the modification of subframe dividing.

FIG. 9A shows an example of weighting based on time when dividing is performed so as to obtain a total of 255 gradation levels across the respective subframes. FIG. 9B shows a table of display gradation and subframes when dividing is performed so as to obtain a total of 255 gradation levels across the respective subframes. In the example in which dividing is performed so as to obtain a total of 255 gradation levels across the respective subframes, a subframe PWM 18 is used only in a case where there are 240 or more gradation levels. Therefore, according to this modification of subframe dividing, the frequency of occurrence of correction image display is higher than that in the case of a subframe configuration corresponding to the bit data shown in FIG. 5B.

As described above, with (a method for controlling) the display apparatus 40 according to Example 1, the period of an empty second subframe is utilized, so that the number of gradation levels can be increased while the frame rate and the subframe time are fixed. For example, in a case where the least significant bit (LSB) is set at 1, and a second subframe exists during one period, white gradation correction image data is generated, and the display panel is controlled so that the product of the white light quantity and time will be 0.5 during the second subframe. Thus, the number of white gradation levels is doubled. Accordingly, smoother gradation is expressed, and image quality can be improved/increased.

Meanwhile, to increase the number of gradation levels while maintaining a fixed frame rate by a conventional technique, it is necessary to shorten the time of each subframe, and the number of times image data is transmitted from the display control unit 42 to the display panel 46 also increases. Therefore, transmission between the display control unit 42 and the display panel 46 is performed in a higher band, and constraints are imposed on the display panel 46 and the system. In the basic configuration of the display apparatus 40 according to Example 1, on the other hand, a correction image can be displayed through data transmission performed as many times. Thus, the number of gradation levels can be increased, while the transmission band between the display control unit 42 and the display panel 46 remains the same.

Further, even in a case where a binary display device in an on- or off-state such as a MEMS mirror is used as a light modulation device provided for each pixel in the display panel 46, gradation levels can be raised especially in a dark display image. Accordingly, gamma characteristics can be set more finely. Thus, noise and blackening at a time of displaying low gradation levels can be reduced.

Furthermore, in a case where second subframes exist for all of red, green, and blue, gradation levels of each color can be raised, and thus, the maximum number of display colors increases. For example, the maximum number of display colors in a case where the display image has gradation levels 0 to 239 of all of red, green, and blue is as follows.

Without application of the technology according to the present disclosure: R 240×G 240×B 240≈13.82 million colors With application of the technology according to the present disclosure: R 479×G 479×B 479≈109.9 million colors Thus, about eight times as many colors can be displayed.

Example 2

Example 2 is a modification of Example 1, and is a modification of the correction image data to be generated by the correction image generation unit 413.

In Example 1, the correction image data to be generated by the correction image generation unit 413 is used as image data for correcting the gradation of input image data. In Example 2, on the other hand, the correction image data to be generated by the correction image generation unit 413 is used as image data for correcting the color gamut. In a case where the color gamut is to be expanded, for example, light of complementary colors such as cyan/magenta/yellow for displaying an image subjected to color gamut correction is emitted on a second subframe, in addition to RGB light emission on the first subframe.

The image data for correcting the color gamut is displayed during the period of the second subframe, and the illumination light such as cyan/magenta/yellow light is emitted as described above, so that the color gamut of the image can be improved/expanded. Further, the correction image generation unit 413 can also be designed to generate correction image data for correcting the resolution of input image data. As a correction image for correcting resolution is generated, it becomes possible to increase the resolution of the entire screen.

Example 3

Example 3 is a modification of Example 1, and is an example of the timing of generating correction image data.

In the display apparatus 40 according to Example 1, correction image data according to Example 3 may be generated after detection of a second subframe, or may be constantly generated for input image data, regardless of the presence or absence of a second subframe. In a case where correction image data is constantly generated, the image detection unit 412 detects the presence or absence of a second subframe. In a case where a second subframe is present, information indicating the presence is transmitted to the system control unit 47.

Receiving the information indicating the presence of a second subframe from the image detection unit 412, the system control unit 47 issues an instruction to the memory control unit 421 to store the correction image data generated by the correction image generation unit 413 into the image memory 43. In response to this instruction, the memory control unit 421 stores the correction image data into the image memory 43. After that, the memory control unit 421 performs sequence processing, and transmits the correction image data to the display panel 46 through the data transmission unit 424.

Example 4

Example 4 is a modification of Example 1, and is an example configuration of a second subframe.

In the display apparatus 40 according to Example 1, a second subframe is formed with one subframe or a plurality of subframes, and correction image data is then generated in Example 4. For example, in the configuration of a subframe weighted based on time as shown in FIG. 9A, the two subframes PWM 17 and PWM 18 are not used in a case where an image having gradation levels 0 to 223 is displayed, and these two subframes are recognized as a second subframe. In this case, different correction image data can be displayed: gradation correction image data in the subframe PWM 17, and color gamut correction image data in the subframe PWM 18.

Example 5

Example 5 is an example in which the display panel 46 is formed with a single plate, and is controlled by field sequential colors.

In a case where the display panel 46 is formed with a single plate and is controlled with field sequential colors, a display image may be an image in which the red color is from 0 to 255, the green color is from 0 to 239, and the blue color is from 0 to 255. In the display apparatus 40 according to Example 1, if subframe dividing is performed with a weighting configuration as shown in FIGS. 9A and 9B, the image detection unit 412 detects that any second subframe is not present for red/blue, and a second subframe is present only for green during one period in Example 5.

Figure 10:
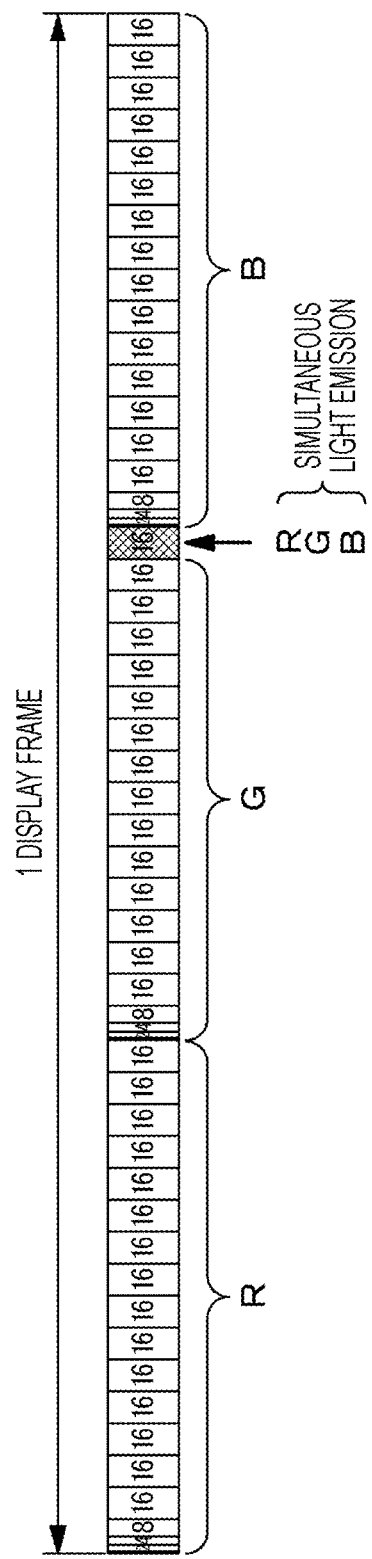
FIG. 10 is a diagram showing a single-plate subframe configuration and an example of multiple light emission.

In this case, the correction image generation unit 413 may generate correction image data for correcting green gradation. Further, it is also possible to generate correction image data for correcting white gradation. In a case where correction image data for white gradation has been generated, the system control unit 47 issues an instruction at the time of illumination of a second subframe of green, and, under the control of the light source control unit 423, the light source 44 causes the light sources of a plurality of colors, specifically RGB, to simultaneously emit light, as shown in FIG. 10. As a result, white light can be emitted onto the display panel 46. As such control is performed, a second subframe of only one of the red, green, and blue colors can affect an entire image.

Example 6

Example 6 is a modification of Example 1, and is an example of a light source that illuminates the display panel during the period of a second subframe.

In the display apparatus 40 according to Example 1, the light source that illuminates the display panel 46 during the period of the second subframe may be a light source of the same wavelength as that of the period of the first subframe, or may be a light source of a different wavelength from that of the period of the first subframe in Example 6. In the latter case, when the second subframe is displayed, the light source control unit 423 performs control to switch to the light source of a different wavelength from that of the first subframe, under the control of the system control unit 47.

Example 7

Example 7 is a modification of Example 1, and is an example sequence in which a second subframe is divided.

In the case of a configuration formed with the subframes shown in FIGS. 9A and 9B, the display image data may be image data in which the red color is from 0 to 255, the green color is from 0 to 239, and the blue color is from 0 to 255. In this case, a second subframe of green is present during only one period, and the time of the second subframe is expressed as: time of one display frame×16/(255×3).

Figure 11:
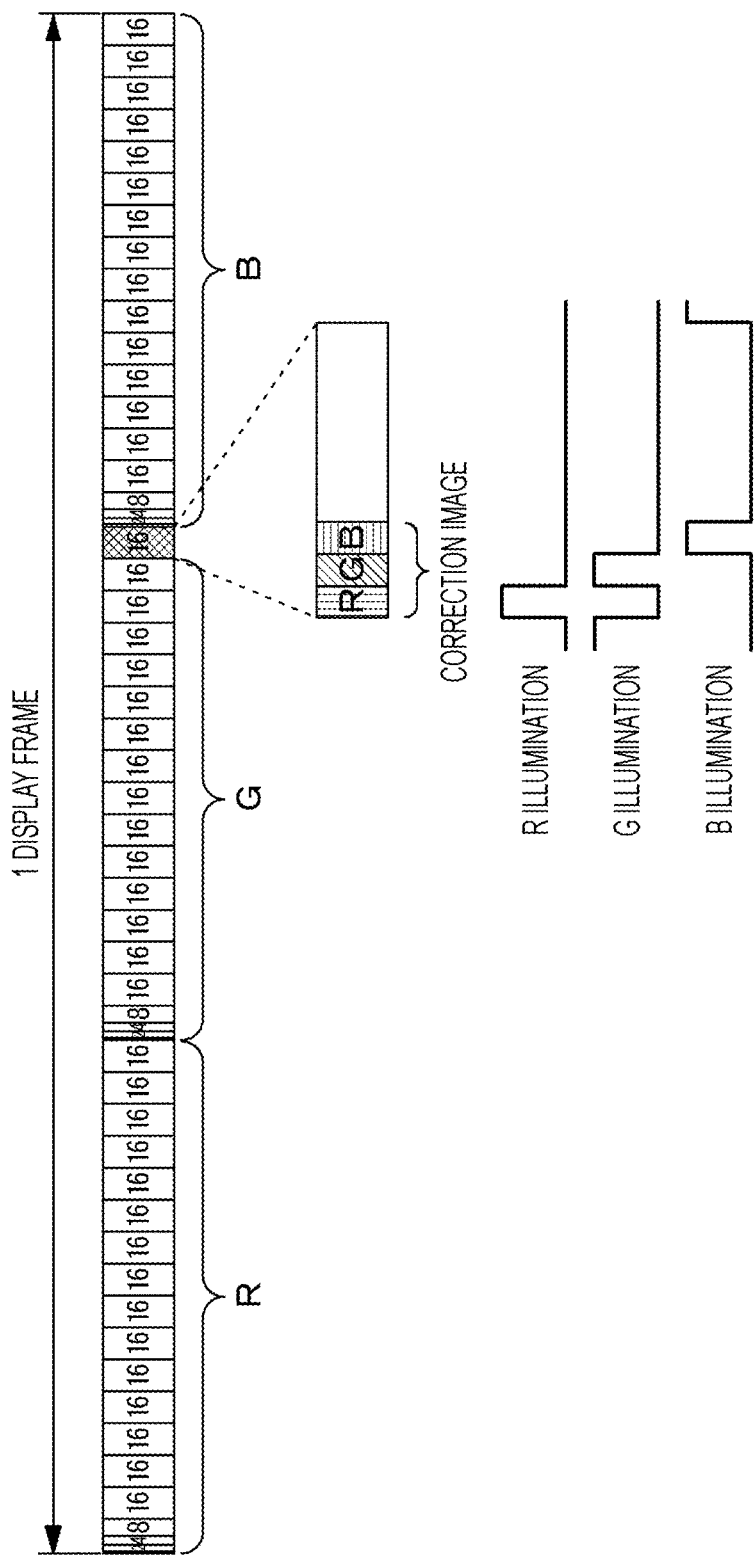
FIG. 11 is a diagram showing an example sequence in which a second subframe is divided.

In Example 7, the period of a second subframe that is present during only one period is further divided into a plurality of subframes, and different correction image data is displayed in each of the divided subframes. As shown in FIG. 11, a piece of correction image data is generated for each of the red, green, and blue colors, and the second subframe of green that is present is divided and displayed for each of the display times of the respective pieces of the correction image data. Regarding the illumination in this case, the light source control unit 423 can switch the light sources of the respective colors for illumination, in accordance with an instruction from the system control unit 47. As described above, even in a case where a second subframe is present during only one period, it is possible to improve image quality by displaying a plurality of pieces of correction image data.

<Projection System According to an Embodiment>

A display apparatus to which the technology according to Examples 1 to 7 described above is applied (that is, a display apparatus according to an embodiment of the present disclosure) can be used in a MEMS mirror projection system. In the following, specific examples of MEMS mirror projection systems according to an embodiment of the present disclosure are described as Examples 8 to 13.

In a MEMS mirror projection system according to any of Examples 8 to 13 described below, the following functions and effects can be achieved with the use of a display apparatus to which the technology according to Examples 1 to 7 is applied. For example, it is possible to increase the number of gradation levels while fixing the frame rate and the time of a subframe, by utilizing the period of an empty second subframe. Particularly, in a projection system using a binary display device such as a MEMS mirror as a light modulation device, gradation levels can be raised especially in a dark display image, and gamma characteristics can be set more finely. Thus, noise and blackening that are caused when low gradation levels are displayed can be reduced.

Example 8

Figure 12:
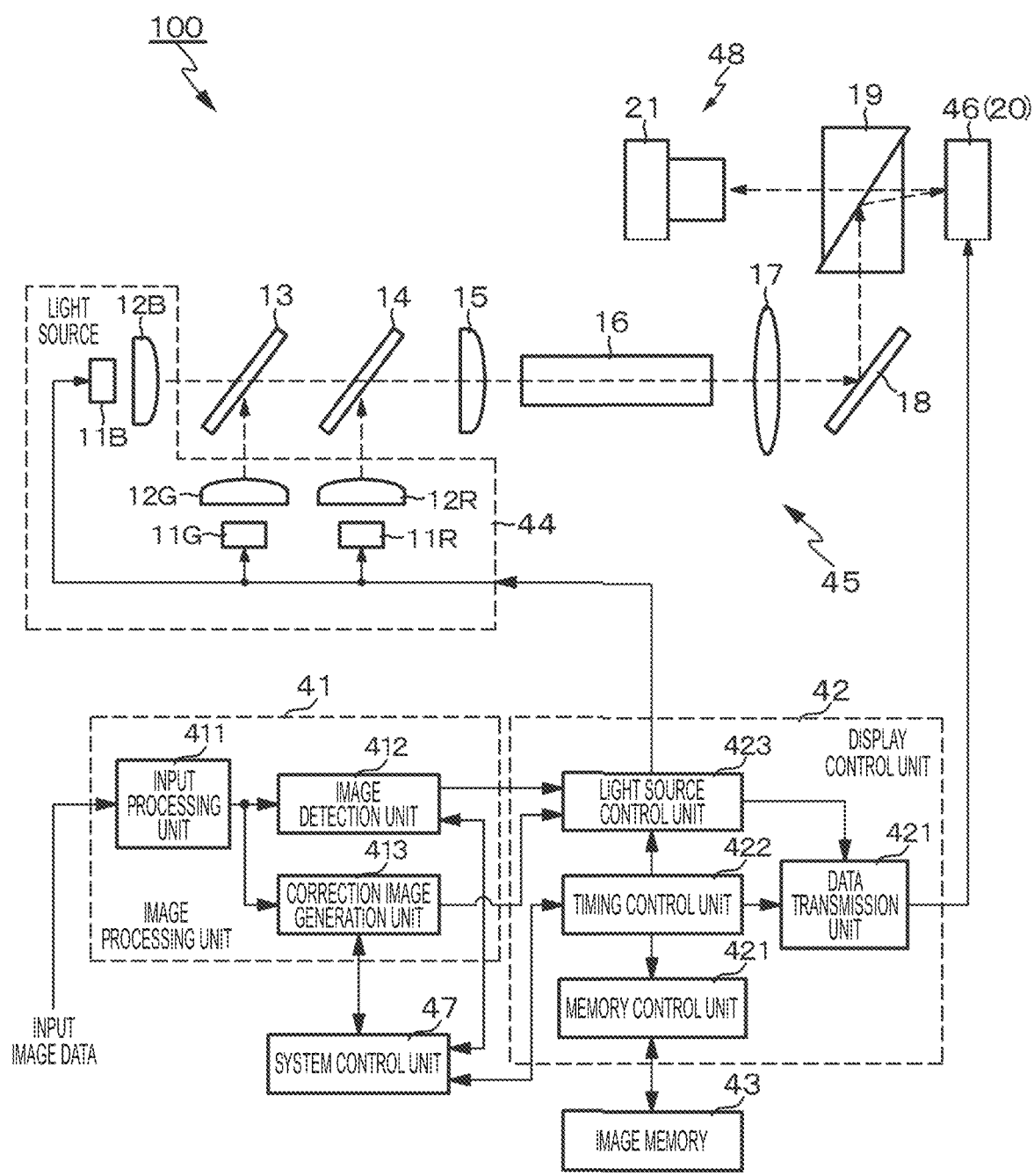
FIG. 12 is a system configuration diagram showing an example configuration of a MEMS mirror projection system according to Example 8.

Example 8 is an example of a MEMS mirror projection system, and is an example of a single plate type. FIG. 12 shows an example configuration of a MEMS mirror projection system according to Example 8.

A MEMS mirror projection system 10 according to Example 8 includes a projection optical system 48 that includes a projection lens 21 in addition to the components of the display apparatus 40 according to Example 1 shown in FIG. 4, which are the image processing unit 41, the display control unit 42, the image memory 43, the light source 44, the optical system 45, the display panel 46, and the system control unit 47. The display panel 46 corresponds to the display panel 20 shown in FIG. 1, and has a configuration in which pixels are arranged in a two-dimensional matrix (a matrix), and a MEMS mirror that is a binary display device in an on- or off-state is provided for each pixel.

The image processing unit 41 and the display control unit 42 have configurations similar to those in the display apparatus 40 according to Example 1 shown in FIG. 4. That is, the image processing unit 41 includes an input processing unit 411, an image detection unit 412, and a correction image generation unit 413, and processes image data that is input from the outside. The display control unit 42 includes a memory control unit 421, a timing control unit 422, a light source control unit 423, and a data transmission unit 424, and, under the control of the system control unit 47, controls the image memory 43 and the light source 44.

The light source 44 includes respective solid-state light sources 11R, 11G, and 11B of red (R), green (G), and blue (B), and lenses 12R, 12G, and 12B. The solid-state light sources 11R, 11G, and 11B can be semiconductor lasers (LD), light emitting diodes (LED), an organic light emitting diodes (OLED), or the like, for example.

The optical system 45 includes dichroic mirrors 13 and 14, a lens 15, a rod integrator 16, a lens 17, a mirror 18, and a total reflection prism 19. Light emitted from the solid-state light sources 11R, 11G, and 11B enters the rod integrator 16 via the dichroic mirrors 13 and 14, and the lens 15. Then, the light uniformized by the rod integrator 16 is then emitted onto the display panel 46 through the lens 17, the mirror 18, and the total reflection prism 19.

The respective solid-state light sources 11R, 11G, and 11B of the light source 44 are controlled by the display control unit 42 under the control of the system control unit 47. In the case of the MEMS mirror projection system 10 according to Example 8, which is a single-plate MEMS mirror projection system, the display control unit 42 temporally controls light emission from the solid-state light sources 11R, 11G, and 11B of the respective colors.

Display of each color is performed by sending image data to the display panel 46 through the display control unit 42, after the image processing unit 41 performs desired signal processing on the image data input from the outside. Each pixel of the display panel 46 transitions to a desired state in accordance with control in the display apparatus 40 according to the embodiment described above, in synchronization with the respective solid-state light sources 11R, 11G, and 11B of the light source 44. Then, the pixels in a bright state (an on-state) in the display panel 46 are then projected onto a projection target such as a screen via the projection lens 21.

Example 9

Example 9 is an example in which the quantity of irradiation light emitted from the light source 44 onto the display panel 46 is controlled (changed) in synchronization with subframes in accordance with the subframe driving system. The case of a three-plate projection system is now described as an example.

Figure 13A:
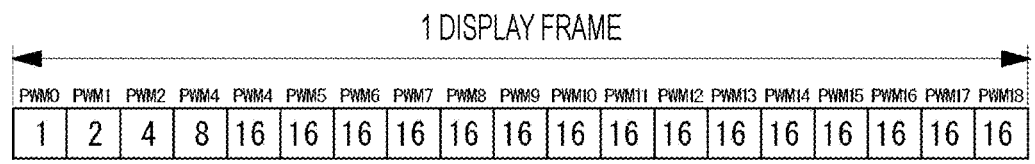
FIG. 13A is a diagram showing an example of weighting in accordance with the irradiation light quantities at the time when one display frame period is equally divided.

In a case where the display panel 46 is used in the form of an 8-bit, three-plate panel, for example, subframes can be equally divided as shown in FIG. 13A. FIG. 13A shows an example of weighting in accordance with the light quantity of irradiation light. In FIG. 13A, the width of a subframe PWM is the length obtained by dividing the period of one display frame by 19, and the numerical value of a subframe PWM is a light quantity level.

Figure 13B:
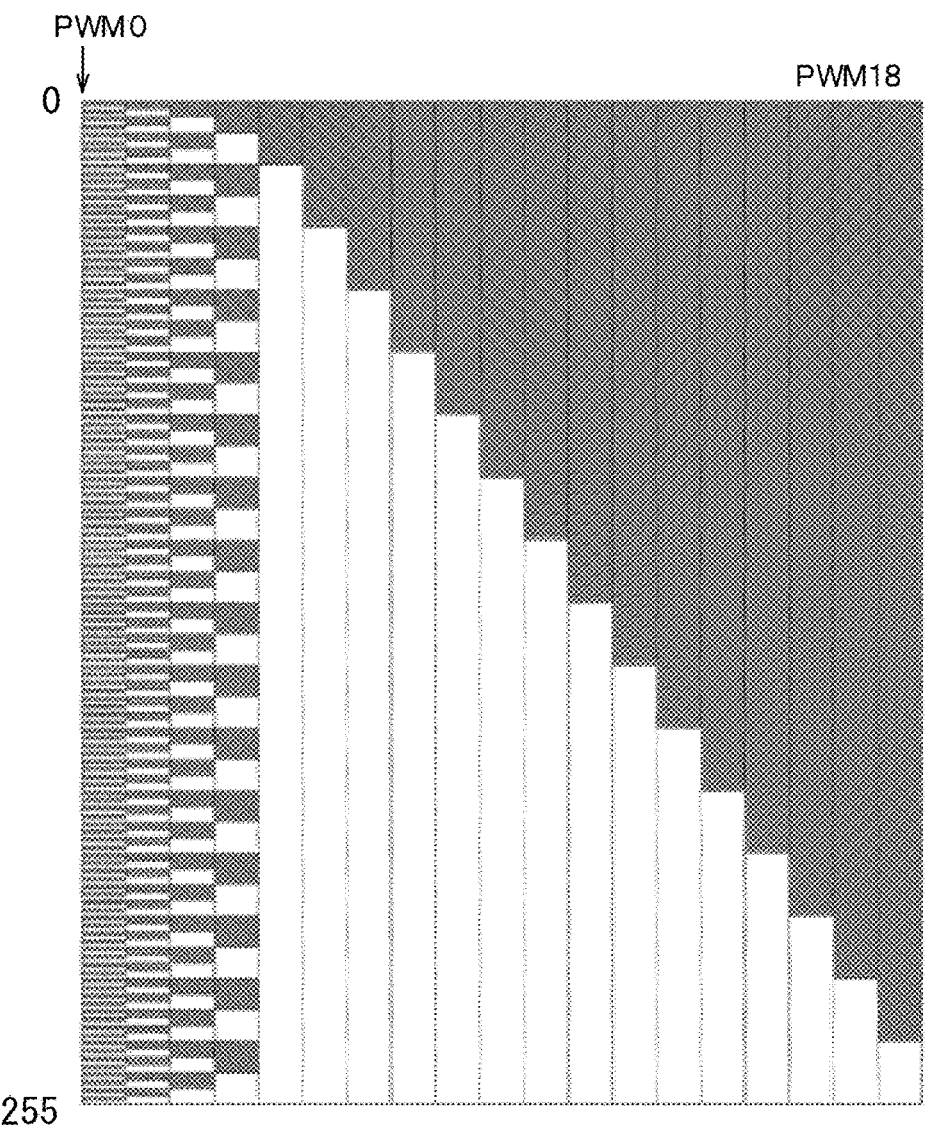
FIG. 13B is a diagram showing a table of display gradation and subframes at the time when the subframes are equally divided.

As shown in FIG. 13B, eight bits can express gradation levels 0 to 255, and accordingly, the number of weights added to the images displayed in the respective subframes is 255 in total. In this case, when the light quantity of irradiation light that is emitted onto the display panel 46 is constant, gradation is expressed by "time×light quantity". Therefore, a binary image at a low gradation level and a high-intensity image are displayed with the same light quantity. As a result, normal gradation expression cannot be performed.

Therefore, in Example 9, under the control of the system control unit 47, control is performed to change the light quantities of irradiation light that is emitted from the respective solid-state light sources 11R, 11G, and 11B of the light source 44 onto the display panel 46, in synchronization with the respective subframes, as shown in FIG. 14. FIG. 14 shows an example of light quantity control at the time when the subframes are equally divided. As the weights on the binary images to be displayed with the respective subframes are determined by light quantities, normal gradation expression is possible.

In a case where the control according to Example 9 is performed on the display panel 46, input image data is input to the image detection unit 412 after the input processing unit 411 performs image correction such as gamma processing on the input image data. The image detection unit 412 determines the image level of an entire frame, and then determines whether there is an empty second subframe in addition to the first subframe for displaying an image with the input image data. For example, only the first subframe is present in an image in which all the gradation levels 0 to 255 are displayed. However, in a case where the display image has only gradation levels 0 to 239, there is no image to be displayed with the subframe PWM 18, and therefore, the subframe PWM 18 is detected as an empty second subframe.

In a case where a second subframe is detected, an execution processing signal is transmitted from the system control unit 47 to the correction image generation unit 413. In response to this, the correction image generation unit 413 generates image data of 0.5/255, which is lower in gradation level than PWM 0, with PWM 0 being 1/255, for example. The image data in the first subframe and the second subframe is then temporarily stored into the image memory 43, under the control of the memory control unit 421, and is transmitted to the display panel 46 via the data transmission unit 424 in accordance with a sequence.

As for the quantity of the irradiation light to be emitted onto the display panel 46 at this point of time, the same light quantity control as that shown in FIG. 14 is performed from PWM 0 to PWM 17. Also, as for the light quantity for PWM 18 that displays the correction image data generated by the correction image generation unit 413, light quantity control is performed so that the display panel 46 is irradiated with the light quantity of 0.5, as shown in FIG. 15. FIG. 15 shows an example of the light quantity control at a time when a second subframe is detected.

By performing the light quantity control according to Example 9 as described above, or by performing control to change the quantity of the irradiation light from the light source 44 in synchronization with the subframes, it is possible to display an image with smoother gradation in increments of 0.5, in place of an image with gradation expression in increments of 1, when displaying gradation levels 0 to 239.

Note that, in this example, the respective solid-state light sources 11R, 11G, and 11B of the light source 44 are controlled under the control of the light source control unit 423, to control the quantity of the irradiation light from the light source 44 in synchronization with the subframes. However, embodiments are not limited to this example. That is, light quantity control similar to the above can be performed with the use of a device (a variable light quantity adjustment filter) capable of changing the light quantity level such as a neutral density (ND) filter, without controlling the respective solid-state light sources 11R, 11G, and 11B of the light source 44.

The light quantity control technique according to Example 9 can be applied not only to a three-plate projection system but also to a single-plate projection system, and further, can be applied not only to projection systems but also to the display apparatus 40 according to the embodiment described above. It is similar in Examples described below.

Example 10

Example 10 is a modification of Example 5, and is an example of light quantity control on a second subframe in the sequence of Example 5 (at a time when subframes are divided so that a total of 255 gradation levels are obtained across the respective subframes).

For example, in the case of the sequence according to Example 5, or in a case where subframes are divided so that a total of 255 gradation levels are obtained across the respective subframes, when an input image has gradation levels 0 to 239, light at the light quantity level "1" is constantly emitted onto the display panel 46 from PWM 0 to PWM 17, and the light amount level is controlled to 1/32 in synchronization with PWM 18 that displays an image with gradation levels in increments of 0.5.

In this case, the display image of each subframe is displayed with an intensity expressed as "time×light quantity level", as shown in FIG. 16. FIG. 16 shows an example of light quantity control on a second subframe at a time when subframes are divided so that a total of 255 gradation levels are obtained across the respective subframes. By changing the light quantity in two or more stages in this manner, it is possible to raise gradation levels.

Example 11

Example 11 is an example of correction image data that is generated in a second subframe. The correction image data that is generated in the second subframe may be correction image data for correcting a single color, or may be correction image data for correcting a plurality of colors.

Figure 17:
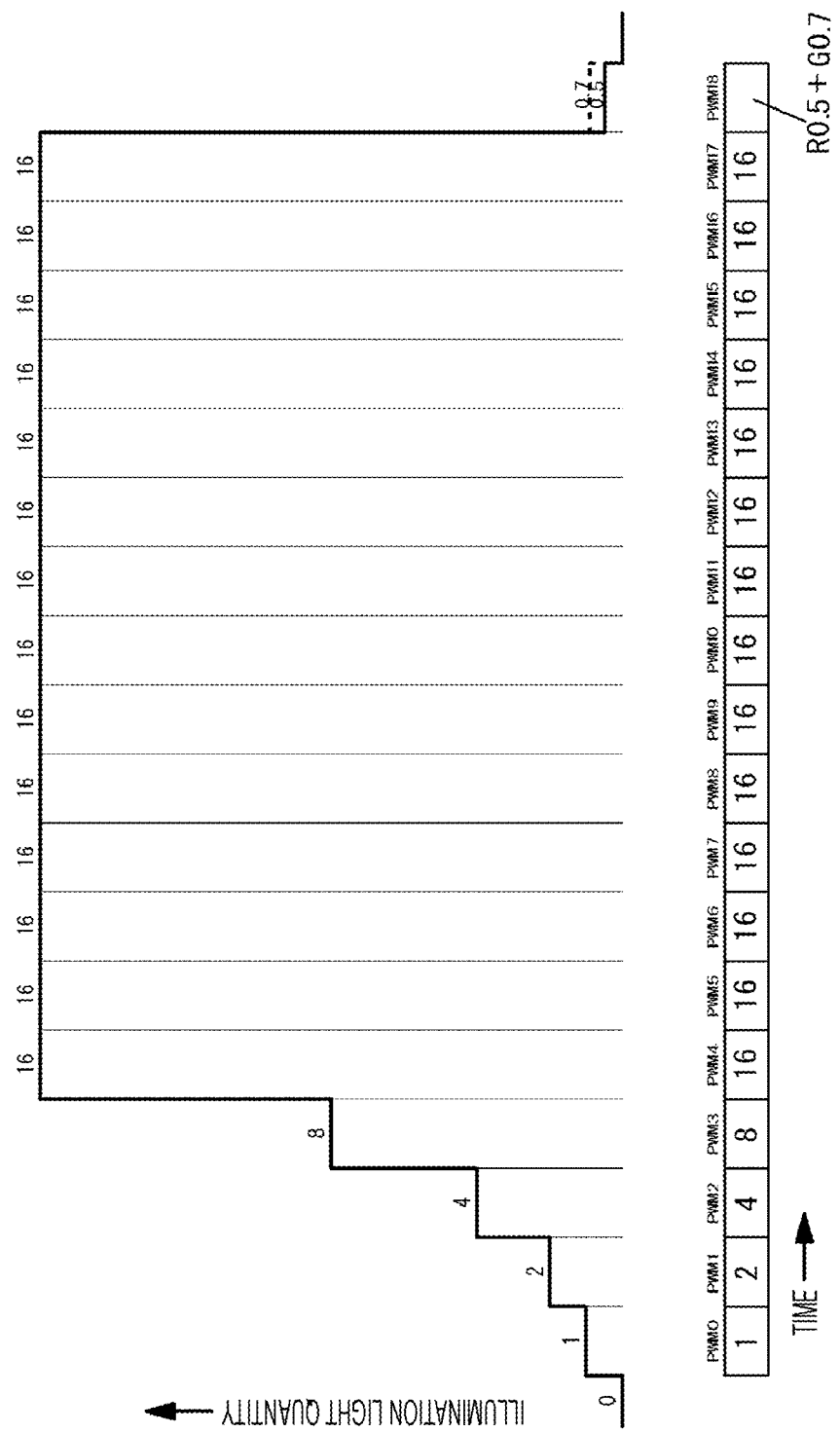
FIG. 17 is a diagram showing an example of the multiple light quantity control at a time when a second subframe is detected.

For example, in a case where the first subframe is formed with the three colors of red, green, and blue, and the second subframe has only a period of the red color, when correction image data for correcting yellow, which is a complementary color, is generated, illumination light of yellow, which is red and green, is emitted onto the display panel 46 in the second subframe, as shown in FIG. 17. Thus, the color gamut can be corrected. FIG. 17 shows an example of the multiple light quantity control at a time when a second subframe is detected.

The light source that illuminates the display panel 46 during the period of the second subframe may be a light source having the same wavelength as that of the period of the first subframe, or may be a light source having a different wavelength from that of the period of the first subframe. In the latter case, when the second subframe is displayed, the light source control unit 423 performs control to switch to the light source of a different wavelength from that of the first subframe, under the control of the system control unit 47.

The light that is emitted during the period of the second subframe may be emitted over the entire period of the second subframe. Further, in a case where the illumination light quantity expresses a darker gradation level than the lower limit, the emission time during the period of the second subframe is shortened, and the light is emitted only during part of the period of the second subframe. Thus, a darker gradation level can be expressed with a relationship between time and the light quantity.

Example 12

Figure 18:
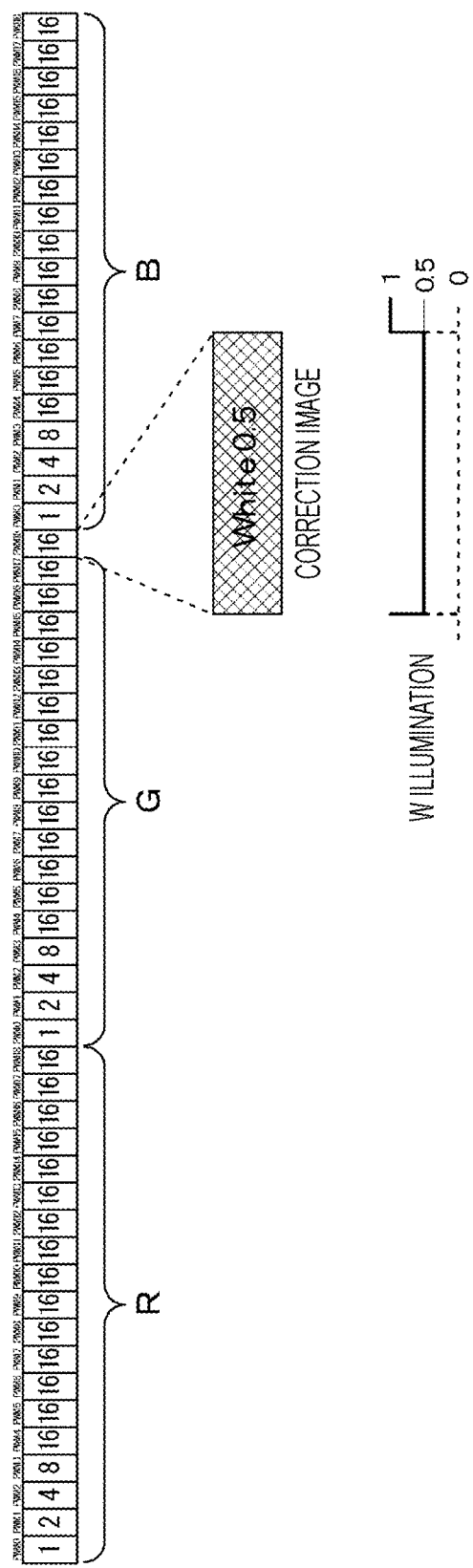
FIG. 18 is a diagram showing an example of the control on the light quantity and the correction image at a time of second subframe detection according to Example 12.

Example 12 is a modification of Example 9, and is an example of the control on the light amount and the correction image at a time when a second subframe is detected. FIG. 18 shows an example of the control on the light quantity and the correction image at a time of second subframe detection according to Example 12.

In the case of a configuration formed with the subframes shown in FIG. 18, the display image may be an image in which the red color is from 0 to 255, the green color is from 0 to 239, and the blue color is from 0 to 255. In this case, a second subframe of green is present during only one period, and the time of the second subframe is equal to "time of one display frame×$19_{PWM0-18}$/(255×3)". As shown in FIG. 18, by setting the quantities of light of red, green, and blue at 0.5, it is possible to realize gradation expression of white in increments of 0.5.

Example 13

Example 13 is a modification of Example 12, and is an example of the control on the light amount and the correction images at a time when a second subframe is detected.

In addition to the control according to Example 12, the period of the second subframe is further divided into a plurality of subframes in Example 13, and different correction image data is displayed in each of the divided subframes. In Example 13, the second subframe is divided into two halves, for example, and image data for correcting gradation in increments of 0.5 and image data for correcting gradation in increments of 0.25 are generated and displayed in the respective halves.

Figure 19:
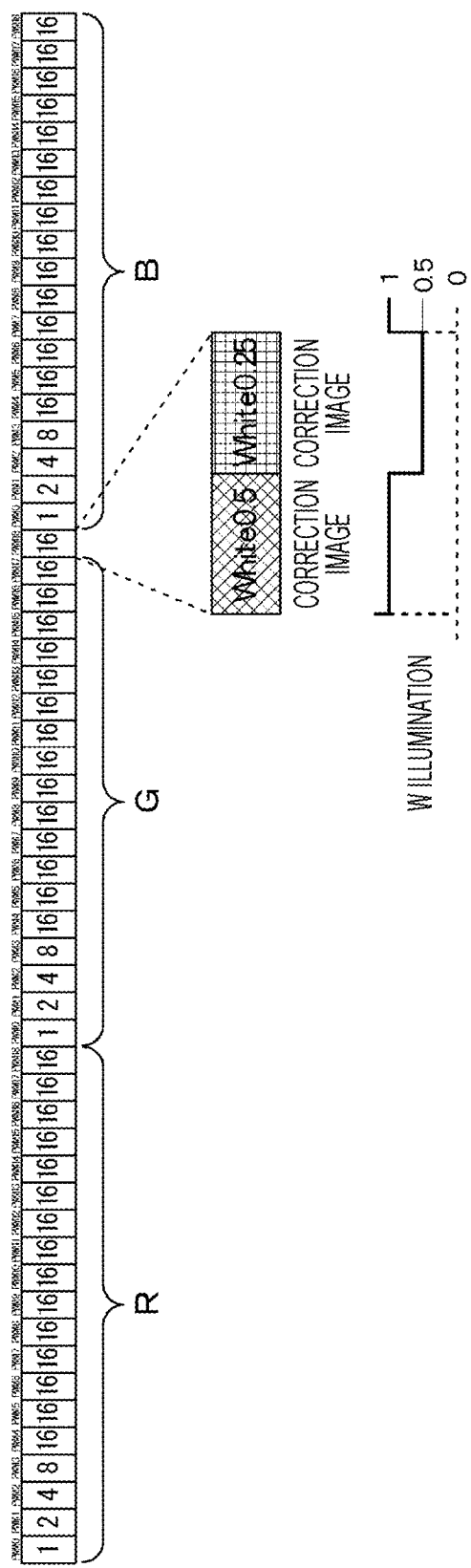
FIG. 19 is a diagram showing an example of the control on the light quantity and the correction images at a time of second subframe detection according to Example 13.

As for the light quantity level at this point of time, a light quantity of 0.5 is emitted in the control according to Example 12. However, in the control according to Example 13, light is emitted at the light quantity level "1" in a case where the second subframe is divided into two halves, as shown in FIG. 19. This is because the display gradation is expressed by the relationship between the light quantity and time. FIG. 19 shows an example of the control on the light quantity and the correction images at a time of second subframe detection according to Example 13. In the example shown in FIG. 19, a correction image for performing correction in increments of 0.25 is generated and displayed in the latter time of the second subframe, and light at the light quantity level of 0.5 is emitted. Thus, smooth gradation expression can be realized.

<Modifications>

Although the technology according to the present disclosure has been described so far on the basis of preferred embodiments, the technology according to the present disclosure is not limited to those embodiments. The configurations and structures of the display apparatus and the projection system described in the above embodiments are examples, and can be modified as appropriate. For example, in the above embodiments, a display apparatus or a projection system that uses MEMS mirrors as light modulation devices has been described as an example. However, the technology according to the present disclosure can also be applied to a display apparatus or a projection system that uses high-temperature poly silicon (HTPS) or liquid crystal on silicon (LCOS) for the light modulation devices.

<Configurations in which the Present Disclosure can be Embodied>

Note that the present disclosure can also be embodied in the configurations described below.

<<A. Display Apparatus>>

[A-1] A display apparatus including:
- an image detection unit that detects presence of an empty second subframe in input image data, in addition to a first subframe that displays an image;
- a correction image generation unit that generates correction image data for correcting the input image data;
- a control unit that performs control to display the correction image data generated by the correction image generation unit during the period of the second subframe, when the image detection unit detects the presence of the second subframe; and
- a display panel that includes a light modulation device provided for each pixel, and modulates irradiation light from a light source, on the basis of input image data including the correction image data.

[A-2] The display apparatus according to [A-1], in which the light modulation device is formed with a binary display device in an on- or off-state.

[A-3] The display apparatus according to [A-2], in which the light modulation device is formed with a MEMS mirror.

[A-4] The display apparatus according to any one of [A-1] to [A-3], in which the correction image generation unit generates correction image data for correcting the gradation, the color gamut, or the resolution of the input image data.

[A-5] The display apparatus according to [A-4], in which the correction image generation unit generates the correction image data, after detection of the second subframe, or regardless of presence or absence of the second subframe.

[A-6] The display apparatus according to any one of [A-1] to [A-5], in which the second subframe is formed with one subframe or a plurality of subframes.

[A-7] The display apparatus according to any one of [A-1] to [A-6], in which the light source emits light of a single color or a plurality of colors onto the display panel during the period of the second subframe.

[A-8] The display apparatus according to any one of [A-1] to [A-6], in which the light source that illuminates the display panel during the period of the second subframe is a light source having the same wavelength as the wavelength during the period of the first subframe, or a light source having a different wavelength from the wavelength during the period of the first subframe.

[A-9] The display apparatus according to any one of [A-1] to [A-8], in which the light source emits illumination light onto the display panel over the entire period of the second subframe or during part of the period of the second subframe.

[A-10] The display apparatus according to any one of [A-1] to [A-9], in which the period of the second subframe is divided into a plurality of subframes, and different correction image data is displayed during the periods of the plurality of divided subframes.

[A-11] The display apparatus according to any one of [A-1] to [A-10], in which the control unit controls the quantity of the irradiation light generated by the light source, in synchronization with the subframes.

[A-12] The display apparatus according to [A-11], in which the control unit controls the light source in synchronization with the subframes.

[A-13] The display apparatus according to [A-11] or [A-12], in which the control unit changes the quantity of the irradiation light generated by the light source, in two or more stages.

[A-14] The display apparatus according to any one of [A-11] to [A-13], in which the light source emits light of a single color or a plurality of colors onto the display panel during the period of the second subframe.

[A-15] The display apparatus according to any one of [A-11] to [A-14], in which the light source that illuminates the display panel during the period of the second subframe is a light source having the same wavelength as the wavelength during the period of the first subframe, or a light source having a different wavelength from the wavelength during the period of the first subframe.

[A-16] The display apparatus according to any one of [A-11] to [A-15], in which the light source emits illumination light onto the display panel over the entire period of the second subframe or during part of the period of the second subframe.

[A-17] The display apparatus according to any one of [A-11] to [A-16], in which the period of the second subframe is divided into a plurality of subframes, and different correction image data is displayed during the periods of the plurality of divided subframes.

<<B. Method for Controlling a Display Apparatus>>

[B-1] A display apparatus control method including:
- detecting presence of an empty second subframe in input image data, in addition to a first subframe that displays an image, and generating correction image data for correcting the input image data;
- performing control to display the generated correction image data during the period of the second subframe, when the presence of the second subframe is detected; and
- modulating irradiation light from a light source, on the basis of input image data including the correction image data, in a display panel that includes a light modulation device provided for each pixel.

[B-2] The display apparatus control method according to [B-1], in which the light modulation device is formed with a binary display device in an on- or off-state.

[B-3] The display apparatus control method according to [B-2], in which the light modulation device is formed with a MEMS mirror.

[B-4] The display apparatus control method according to any one of [B-1] to [B-3], in which the correction image data is correction image data for correcting the gradation, the color gamut, or the resolution of the input image data.

[B-5] The display apparatus control method according to [B-4], in which
the correction image data is generated, after detection of the second subframe, or regardless of presence or absence of the second subframe.

[B-6] The display apparatus control method according to any one of [B-1] to [B-5], in which
the second subframe is formed with one subframe or a plurality of subframes.

[B-7] The display apparatus control method according to any one of [B-1] to [B-6], in which
light of a single color or a plurality of colors is emitted onto the display panel during the period of the second subframe.

[B-8] The display apparatus control method according to any one of [B-1] to [B-6], in which,
during the period of the second subframe, light having the same wavelength as the wavelength during the period of the first subframe, or light having a different wavelength from the wavelength during the period of the first subframe is emitted onto the display panel.

[B-9] The display apparatus control method according to any one of [B-1] to [B-8], in which
illumination light is emitted onto the display panel over the entire period of the second subframe or during part of the period of the second subframe.

[B-10] The display apparatus control method according to any one of [B-1] to [B-9], in which
the period of the second subframe is divided into a plurality of subframes, and different correction image data is displayed during the periods of the plurality of divided subframes.

[B-11] The display apparatus control method according to any one of [B-1] to [B-10], in which
the quantity of the irradiation light generated by the light source is controlled in synchronization with the subframes.

[B-12] The display apparatus control method according to [B-11], in which
the light source is controlled in synchronization with the subframes.

[B-13] The display apparatus control method according to [B-11] or [B-12], in which
the quantity of the irradiation light generated by the light source is changed in two or more stages.

[B-14] The display apparatus control method according to any one of [B-11] to [B-13], in which
light of a single color or a plurality of colors is emitted onto the display panel during the period of the second subframe.

[B-15] The display apparatus control method according to any one of [B-11] to [B-14], in which,
during the period of the second subframe, light having the same wavelength as the wavelength during the period of the first subframe, or light having a different wavelength from the wavelength during the period of the first subframe is emitted onto the display panel.

[B-16] The display apparatus control method according to any one of [B-11] to [B-15], in which
illumination light is emitted onto the display panel over the entire period of the second subframe or during part of the period of the second subframe.

[B-17] The display apparatus control method according to any one of [B-11] to [B-16], in which
the period of the second subframe is divided into a plurality of subframes, and different correction image data is displayed during the periods of the plurality of divided subframes.

<<C. Projection System>>

[C-1] A projection system including:
an image detection unit that detects presence of an empty second subframe in input image data, in addition to a first subframe that displays an image;
a correction image generation unit that generates correction image data for correcting the input image data;
a control unit that performs control to display the correction image data generated by the correction image generation unit during the period of the second subframe, when the image detection unit detects the presence of the second subframe;
a display panel that includes a light modulation device provided for each pixel, and modulates irradiation light from a light source, on the basis of input image data including the correction image data; and
a projection optical system that projects light that has passed through the display panel.

[C-2] The projection system according to [C-1], in which
the light modulation device is formed with a binary display device in an on- or off-state.

[C-3] The projection system according to [C-2], in which
the light modulation device is formed with a MEMS mirror.

[C-4] The projection system according to any one of [C-1] to [C-3], in which
the correction image generation unit generates correction image data for correcting the gradation, the color gamut, or the resolution of the input image data.

[C-5] The projection system according to [C-4], in which
the correction image generation unit generates the correction image data, after detection of the second subframe, or regardless of presence or absence of the second subframe.

[C-6] The projection system according to any one of [C-1] to [C-5], in which
the second subframe is formed with one subframe or a plurality of subframes.

[C-7] The projection system according to any one of [C-1] to [C-6], in which
the light source emits light of a single color or a plurality of colors onto the display panel during the period of the second subframe.

[C-8] The projection system according to any one of [C-1] to [C-6], in which
the light source that illuminates the display panel during the period of the second subframe is a light source having the same wavelength as the wavelength during the period of the first subframe, or a light source having a different wavelength from the wavelength during the period of the first subframe.

[C-9] The projection system according to any one of [C-1] to [C-8], in which
the light source emits illumination light onto the display panel over the entire period of the second subframe or during part of the period of the second subframe.

[C-10] The projection system according to any one of [C-1] to [C-9], in which
the period of the second subframe is divided into a plurality of subframes, and different correction image data is displayed during the periods of the plurality of divided subframes.

[C-11] The projection system according to any one of [C-1] to [C-10], in which
the control unit controls the quantity of the irradiation light generated by the light source, in synchronization with the subframes.

[C-12] The projection system according to [C-11], in which the control unit controls the light source in synchronization with the subframes.

[C-13] The projection system according to [C-11] or [C-12], in which the control unit changes the quantity of the irradiation light generated by the light source, in two or more stages.

[C-14] The projection system according to any one of [C-11] to [C-13], in which
the light source emits light of a single color or a plurality of colors onto the display panel during the period of the second subframe.

[C-15] The projection system according to any one of [C-11] to [C-14], in which
the light source that illuminates the display panel during the period of the second subframe is a light source having the same wavelength as the wavelength during the period of the first subframe, or a light source having a different wavelength from the wavelength during the period of the first subframe.

[C-16] The projection system according to any one of [C-11] to [C-15], in which
the light source emits illumination light onto the display panel over the entire period of the second subframe or during part of the period of the second subframe.

[C-17] The projection system according to any one of [C-11] to [C-16], in which
the period of the second subframe is divided into a plurality of subframes, and different correction image data is displayed during the periods of the plurality of divided subframes.

REFERENCE SIGNS LIST

10 Projection system
11R, 11G, 11B Solid-state light source
13, 14 Dichroic mirror
16 Rod integrator
19 Total reflection prism
20 Display panel
21 Projection lens
30 Screen
40 Display apparatus
41 Image processing unit
42 Display control unit
43 Image memory
44 Light source
45 Optical system
46 Display panel
47 System control unit
48 Projection optical system
412 Image detection unit
413 Correction image generation unit

The invention claimed is:

1. A display apparatus, comprising:
an image detection unit configured to detect presence of an empty second subframe in input image data, in addition to a first subframe that displays an image;
a correction image generation unit configured to generate correction image data to correct the input image data;
a control unit configured to control display of the generated correction image data during a period of the empty second subframe, based on the detection of the presence of the empty second subframe, wherein the generated correction image data is displayed during the period of the empty second subframe; and
a display panel that includes a light modulation device provided for a pixel, and modulates irradiation light from a first light source, based on the input image data including the correction image data, wherein
the first light source illuminates the display panel during the period of the empty second subframe, and
the first light source has a first wavelength during the period of the empty second subframe which is different from a second wavelength of a second light source during a period of the first subframe.

2. The display apparatus according to claim 1, wherein the light modulation device is formed with a binary display device in an on- or off-state.

3. The display apparatus according to claim 2, wherein the light modulation device is formed with an electromagnetically-driven micromirrors (MEMS) mirror.

4. The display apparatus according to claim 1, wherein the correction image generation unit is further configured to generate the correction image data to correct at least one of a gradation, a color gamut, or a resolution of the input image data.

5. The display apparatus according to claim 4, wherein the correction image generation unit is further configured to generate the correction image data one of after the detection of the empty second subframe or regardless of the presence or absence of the empty second subframe.

6. The display apparatus according to claim 1, wherein the empty second subframe is formed with one of one subframe or a plurality of subframes.

7. The display apparatus according to claim 1, wherein the first light source emits one of light of a single color or light a plurality of colors onto the display panel during the period of the empty second subframe.

8. The display apparatus according to claim 1, wherein the first light source emits illumination light onto the display panel over one of the entire period of the empty second subframe or during a part of the period of the empty second subframe.

9. The display apparatus according to claim 1, wherein
the period of the empty second subframe is divided into a plurality of subframes, and
different correction image data is displayed during a plurality of periods of the plurality of divided subframes.

10. The display apparatus according to claim 1, wherein
the control unit is further configured to control a quantity of the irradiation light in synchronization with a subframe of a plurality of subframes, and
the plurality of subframes includes the first subframe and the empty second subframe.

11. The display apparatus according to claim 10, wherein the control unit is further configured to control the first light source in synchronization with the subframe.

12. The display apparatus according to claim 10, wherein the control unit is further configured to change the quantity of the irradiation light in at least two stages.

13. The display apparatus according to claim 10, wherein the first light source emits one of light of a single color or light a plurality of colors onto the display panel during the period of the empty second subframe.

14. The display apparatus according to claim 10, wherein the first light source emits illumination light onto the display panel over one of the entire period of the empty second subframe or during a part of the period of the empty second subframe.

15. The display apparatus according to claim 10, wherein the period of the empty second subframe is divided into a plurality of subframes, and
different correction image data is displayed during a plurality of periods of the plurality of divided subframes.

16. A display apparatus control method, comprising:
detecting presence of an empty second subframe in input image data, in addition to a first subframe that displays an image;
generating correction image data for correcting the input image data;
controlling display of the generated correction image data during a period of the empty second subframe, based on the detection of the presence of the empty second subframe, wherein the generated correction image data is displayed during the period of the empty second subframe; and
modulating irradiation light from a first light source, based on the input image data including the correction image data, in a display panel that includes a light modulation device provided for a pixel, wherein
the first light source illuminates the display panel during the period of the empty second subframe, and
the first light source has a first wavelength during the period of the empty second subframe which is different from a second wavelength of a second light source during a period of the first subframe.

17. A projection system, comprising:
an image detection unit configured to detect presence of an empty second subframe in input image data, in addition to a first subframe that displays an image;
a correction image generation unit configured to generate correction image data to correct the input image data;
a control unit configured to control display of the generated correction image data during a period of the empty second subframe, based on the detection of the presence of the empty second subframe, wherein the generated correction image data is displayed during the period of the empty second subframe;
a display panel that includes a light modulation device provided for a pixel, and modulates irradiation light from a first light source, based on the input image data including the correction image data, wherein
the first light source illuminates the display panel during the period of the empty second subframe, and
the first light source has a first wavelength during the period of the empty second subframe which is different from a second wavelength of a second light source during a period of the first subframe; and
a projection optical system that projects light that has passed through the display panel.

18. The projection system according to claim 17, wherein the light modulation device is formed with a binary display device in an on- or off-state.

* * * * *